US008213760B2

(12) United States Patent
Rudenick et al.

(10) Patent No.: US 8,213,760 B2
(45) Date of Patent: Jul. 3, 2012

(54) FIBER OPTIC ENCLOSURE

(75) Inventors: Paula Rudenick, Eden Prairie, MN (US); James J. Solheid, Lakeville, MN (US); Oscar Fernando Bran de León, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 345 days.

(21) Appl. No.: 12/694,946

(22) Filed: Jan. 27, 2010

(65) Prior Publication Data
US 2010/0189404 A1 Jul. 29, 2010

Related U.S. Application Data

(60) Provisional application No. 61/147,970, filed on Jan. 28, 2009, provisional application No. 61/184,257, filed on Jun. 4, 2009.

(51) Int. Cl.
*G02B 6/00* (2006.01)
(52) U.S. Cl. ........................................ 385/135; 385/134
(58) Field of Classification Search .................... 385/53, 385/88, 89, 134, 135, 136, 137, 138, 139
See application file for complete search history.

(56) References Cited

U.S. PATENT DOCUMENTS

| | | |
|---|---|---|
| 4,805,979 A | 2/1989 | Bossard et al. |
| 5,080,459 A | 1/1992 | Wettengel et al. |
| 5,133,039 A | 7/1992 | Dixit |
| 5,313,546 A | 5/1994 | Toffetti |
| 5,323,478 A | 6/1994 | Milanowski et al. |
| 5,371,663 A | 12/1994 | Chuang |
| 5,479,533 A | 12/1995 | Tanaka |
| 5,495,549 A | 2/1996 | Schneider et al. |
| 5,631,993 A | 5/1997 | Cloud et al. |
| 5,652,820 A | 7/1997 | Glaser et al. |
| 5,692,299 A | 12/1997 | Daems et al. |
| 5,754,723 A | 5/1998 | Fremgen |
| 5,754,724 A | 5/1998 | Peterson et al. |
| 5,778,122 A | 7/1998 | Giebel et al. |

(Continued)

FOREIGN PATENT DOCUMENTS

DE 38 25 756 C1 9/1989

(Continued)

OTHER PUBLICATIONS

Tyco Electronics brochure titled *A World of Fiber*, Jul. 2008 (8 pages).

(Continued)

*Primary Examiner* — Brian Healy
(74) *Attorney, Agent, or Firm* — Merchant & Gould P.C.

(57) ABSTRACT

A fiber optic enclosure includes an enclosure having a base and a cover connected to the base. The base and the cover cooperate to define an interior region. The enclosure includes a tray mount disposed in the interior region. A plurality of fiber optic cable ports is mounted to the enclosure. A tray stack is mounted within the interior region of the enclosure. The tray stack includes a tray mounting plate assembly that is pivotally connected to the tray mount of the enclosure. The tray mounting plate assembly includes a tray mounting plate and a detent that engages the tray mount to selectively retain the tray stack in an opening position and a closed position. The tray stack further includes a plurality of trays mounted to the tray mounting plate.

20 Claims, 25 Drawing Sheets

U.S. PATENT DOCUMENTS

| | | | |
|---|---|---|---|
| 5,790,739 A | 8/1998 | Strause | |
| 5,790,740 A | 8/1998 | Cloud et al. | |
| 5,790,741 A | 8/1998 | Vincent et al. | |
| 5,825,964 A | 10/1998 | Goetter et al. | |
| 5,862,290 A | 1/1999 | Burek et al. | |
| 5,883,999 A | 3/1999 | Cloud et al. | |
| 5,884,001 A | 3/1999 | Cloud et al. | |
| 5,884,002 A | 3/1999 | Cloud et al. | |
| 5,884,003 A | 3/1999 | Cloud et al. | |
| 5,892,870 A | 4/1999 | Fingler et al. | |
| 5,982,870 A | 11/1999 | Pershan et al. | |
| 6,152,767 A | 11/2000 | Roosen et al. | |
| 6,175,079 B1 | 1/2001 | Johnston et al. | |
| 6,226,434 B1 | 5/2001 | Koshiyama et al. | |
| 6,249,632 B1 | 6/2001 | Wittmeier, II et al. | |
| 6,275,639 B1 | 8/2001 | Bolt et al. | |
| 6,275,640 B1 | 8/2001 | Hunsinger et al. | |
| 6,385,381 B1 | 5/2002 | Janus et al. | |
| 6,411,767 B1 | 6/2002 | Burros et al. | |
| 6,453,107 B1 | 9/2002 | Daoud | |
| 6,483,977 B2 | 11/2002 | Battey et al. | |
| 6,504,986 B1 | 1/2003 | Wambeke et al. | |
| 6,507,691 B1 | 1/2003 | Hunsinger et al. | |
| 6,539,160 B2 | 3/2003 | Battey et al. | |
| 6,542,688 B1 | 4/2003 | Battey et al. | |
| 6,621,975 B2 | 9/2003 | Laporte et al. | |
| 6,661,961 B1 | 12/2003 | Allen et al. | |
| 6,721,484 B1 | 4/2004 | Blankenship et al. | |
| 6,766,094 B2 | 7/2004 | Smith et al. | |
| 6,788,786 B1 | 9/2004 | Kessler et al. | |
| 6,797,878 B1 | 9/2004 | Radelet | |
| 6,798,967 B2 | 9/2004 | Battey et al. | |
| 6,856,748 B1 | 2/2005 | Elkins, II et al. | |
| 6,926,449 B1 | 8/2005 | Keenum et al. | |
| 6,963,689 B2 | 11/2005 | Battey et al. | |
| 7,013,074 B2 | 3/2006 | Battey et al. | |
| 7,220,144 B1 | 5/2007 | Elliot et al. | |
| 7,239,789 B2 | 7/2007 | Grubish et al. | |
| 7,330,546 B2 | 2/2008 | Kessler et al. | |
| 7,340,145 B2 | 3/2008 | Allen | |
| 7,589,277 B2 | 9/2009 | Kessler et al. | |
| 7,751,673 B2 | 7/2010 | Anderson et al. | |
| 7,751,675 B2 | 7/2010 | Holmberg et al. | |
| 7,970,249 B2 * | 6/2011 | Solheid et al. | 385/135 |
| 2005/0175307 A1 | 8/2005 | Battey et al. | |
| 2005/0207711 A1 * | 9/2005 | Vo et al. | 385/94 |
| 2005/0271344 A1 | 12/2005 | Grubish et al. | |
| 2006/0083475 A1 | 4/2006 | Grubish et al. | |
| 2007/0104447 A1 | 5/2007 | Allen | |
| 2008/0124038 A1 | 5/2008 | Kowalczyk et al. | |
| 2008/0170832 A1 | 7/2008 | Mullaney et al. | |
| 2008/0279521 A1 | 11/2008 | Kowalczyk et al. | |
| 2009/0058018 A1 | 3/2009 | Mullaney et al. | |
| 2009/0060440 A1 | 3/2009 | Wright et al. | |
| 2009/0252472 A1 | 10/2009 | Solheid et al. | |
| 2009/0290842 A1 | 11/2009 | Bran de Leon et al. | |
| 2010/0189404 A1 * | 7/2010 | Rudenick et al. | 385/135 |
| 2010/0290746 A1 | 11/2010 | Bran de Leon et al. | |

FOREIGN PATENT DOCUMENTS

| | | |
|---|---|---|
| EP | 0 637 767 A2 | 2/1995 |
| EP | 0 797 114 A2 | 9/1997 |
| EP | 1 203 974 A2 | 5/2002 |
| EP | 1 593 994 A2 | 11/2005 |
| EP | 1 832 907 A1 | 9/2007 |
| EP | 1 870 750 A2 | 12/2007 |
| EP | 1 914 578 A2 | 4/2008 |
| GB | 2 367 379 A | 4/2002 |
| WO | WO 98/08125 | 2/1998 |
| WO | WO 2010/098844 A2 | 2/2010 |
| WO | WO 2010/102081 | 9/2010 |

OTHER PUBLICATIONS

Tyco Electronics brochure titled *IFDB-M: Indoor Fiber Distribution Box*, Jun. 2008, (2 pages), available at http://www.telecomosp.pl/pdf/ifdb-m_tc1038_ang.pdf (obtained Nov. 16, 2010).

Photographs showing the fiber distribution box labeled IFDB-M in the Tyco Electronics brochures listed above (5 pages).

International Search Report and Written Opinion mailed May 4, 2010.

* cited by examiner

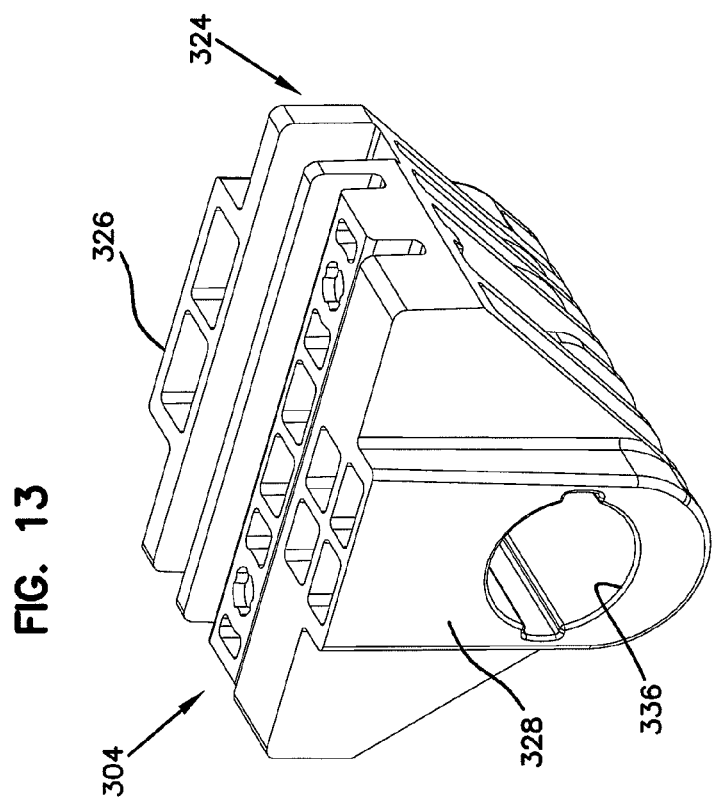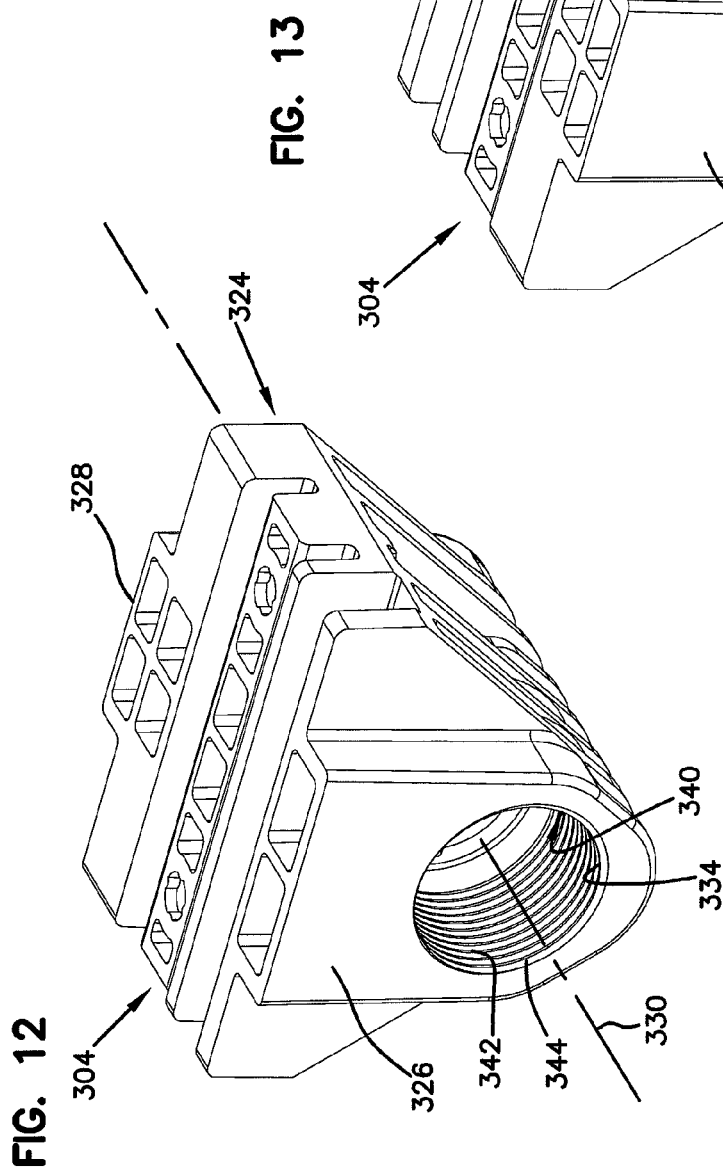

FIBER OPTIC ENCLOSURE

CROSS REFERENCE TO RELATED APPLICATIONS

This application claims the benefit of U.S. Provisional Patent Application Ser. No. 61/147,970, filed Jan. 28, 2009 and entitled "Fiber Optic Enclosure" and U.S. Provisional Patent Application Ser. No. 61/184,257, filed Jun. 4, 2009 and entitled "Fiber Optic Enclosure." The disclosures of the above identified provisional applications are hereby incorporated by reference in their entirety.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of break-out locations 125 at which branch cables are separated out from main cable lines. Breakout locations can also be referred to as tap locations, drop cable locations, splice locations or branch locations. Branch cables can also be referred to as drop cables, drop lines, breakout cables or stub cables. Branch cables are often connected to drop terminals 104 that include connector interfaces for facilitating coupling the fibers of the branch cables to a plurality of different subscriber locations. Breakout locations are often enclosed by a field mounted enclosure which protects optical splices (e.g., fusion or mechanical splices) or other types of optical couplings (e.g., connectorized optical couplings) provide at the breakout location. Since breakout locations are often provided at mid-span locations on the main cable being accessed, it desirable for field mounted enclosures to be readily mountable at mid-span access locations without requiring the main cable to be "threaded" lengthwise through the enclosure.

Fiber optic networks can extend to multi-dwelling units such as apartment buildings and condominiums. FIG. 2 shows a fiber optic network including a cable 150 routed into a multi-dwelling unit 152. Within the multi-dwelling unit 152, branch cables/fibers are optically coupled to the fibers of the cable 150 at optical coupling locations (e.g., fusion splices, mechanical splices or connectorized optical couplings). The optical coupling locations can be enclosed within one or more wall boxes that are typically equipped with doors/covers that can be opened to provide easy access to the optical coupling locations. The wall boxes are typically provided at different floors of the multi-dwelling unit with each wall box having optical coupling locations corresponding to a plurality of different subscribers (e.g., each resident on a given floor).

SUMMARY

Certain aspects of the disclosure relate a wall box for use in a fiber optic network. The wall box can include structure that facilitates mounting the wall box at a mid-span access location of a fiber optic cable.

An aspect of the present disclosure relates to a fiber optic enclosure including an enclosure having a base and a cover connected to the base. The base and the cover cooperate to define an interior region. The enclosure includes a tray mount disposed in the interior region. A plurality of fiber optic cable ports is mounted to the enclosure. A tray stack is mounted within the interior region of the enclosure. The tray stack includes a tray mounting plate assembly that is pivotally connected to the tray mount of the enclosure. The tray mounting plate assembly includes a tray mounting plate and a detent that engages the tray mount to selectively retain the tray stack in an opening position and a closed position. The tray stack further includes a plurality of trays mounted to the tray mounting plate.

Another aspect of the present disclosure relates to a fiber optic enclosure for mounting at a mid-span access location of a fiber optic cable. The fiber optic enclosure includes an enclosure having a base and a cover connected to the base. The base and the cover cooperate to define an interior region. The enclosure includes a tray mount disposed in the interior region. A plurality of fiber optic adapters is mounted to the enclosure. The fiber optic adapters include an inner port positioned inside the interior region and an outer port positioned at an outer surface of the enclosure. A cable cover is mounted in the cover of the enclosure. The cable cover includes a first end portion and an oppositely disposed second end portion. The first and second end portions are engaged to the fiber optic adapters. The cable cover and the cover cooperatively define a space between the cable cover and the cover in which portions of optical fibers are disposed. A tray stack is mounted within the interior region of the enclosure. The tray stack includes a tray mounting plate assembly that is pivotally connected to the tray mount of the enclosure. The tray mounting plate assembly includes a tray mounting plate and a detent that engages the tray mount to selectively retain the tray stack in an opening position and a closed position. The tray stack further includes a plurality of trays mounted to the tray mounting plate.

Another aspect of the present disclosure relates to a fiber optic enclosure for mounting to a mid-span access location of a fiber optic cable. The fiber optic enclosure includes an enclosure having a base and a cover connected to the base. The base and the cover cooperate to define an interior region. The enclosure includes a tray mount disposed in the interior region. A plurality of pass-thru fittings mounted to the enclosure. A tray stack is mounted within the interior region of the enclosure. The tray stack includes a tray mounting plate assembly that is pivotally connected to the tray mount of the enclosure. The tray mounting plate assembly includes a tray mounting plate and a detent that engages the tray mount to selectively retain the tray stack in an opening position and a closed position. The tray stack further includes a plurality of trays mounted to the tray mounting plate. An adapter plate assembly is disposed in the interior region of the enclosure, the adapter plate assembly includes an adapter plate and a plurality of adapters mounted to the adapter plate. The adapter plate is adapted for movement between a first position and a second position.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 12 is a front perspective view of a closure block suitable for use with the enclosure of FIG. 3.

FIG. 13 is a rear perspective view of the closure block of FIG. 12.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
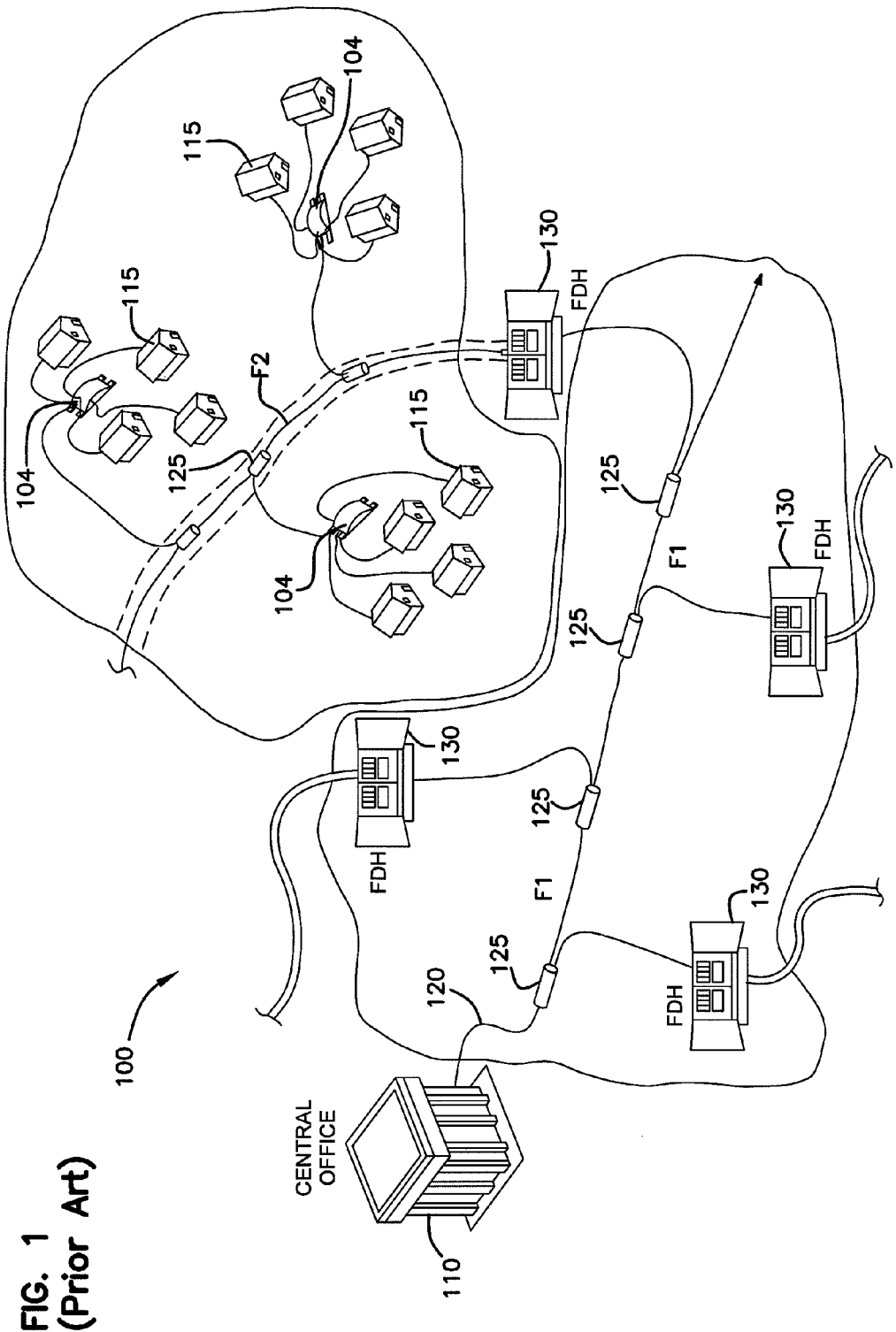
FIG. 1 is a schematic representation of a prior art passive fiber optic network.
Figure 2:
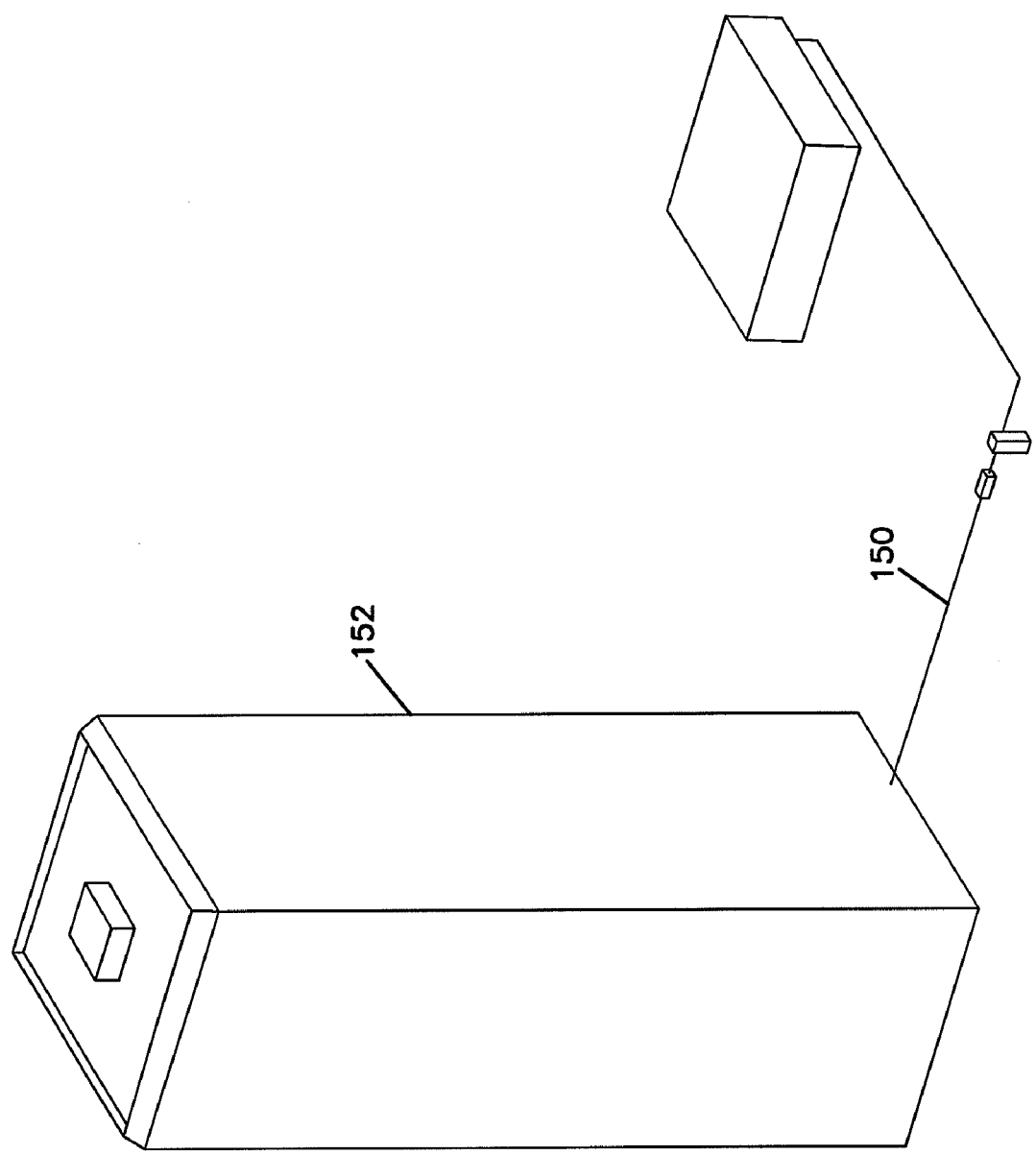
FIG. 2 is a schematic representation of a prior art passive fiber optic network.
Figure 3:
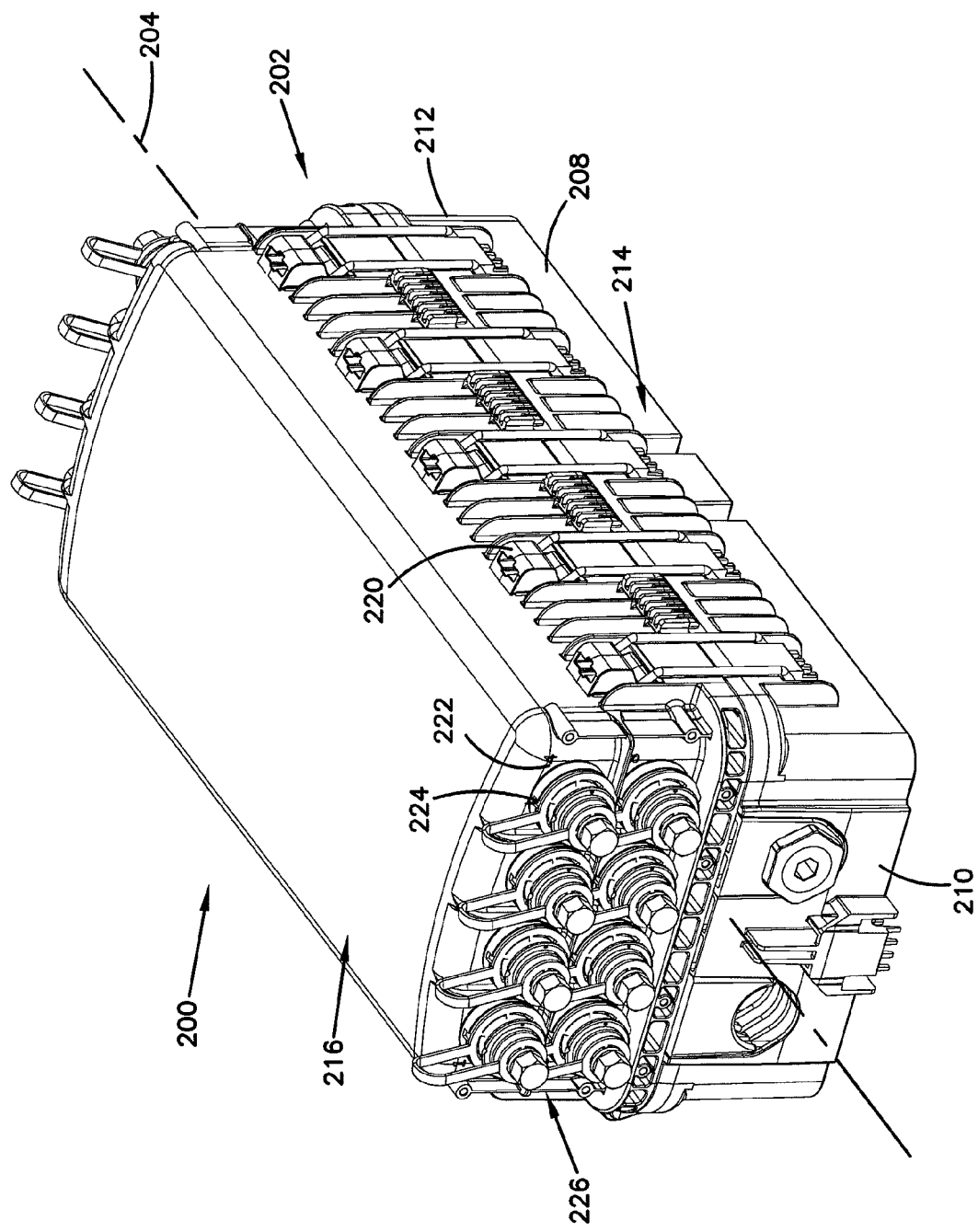
FIG. 3 is a perspective view of a first end of an enclosure having exemplary features of aspects in accordance with the principles of the present disclosure.
Figure 4:
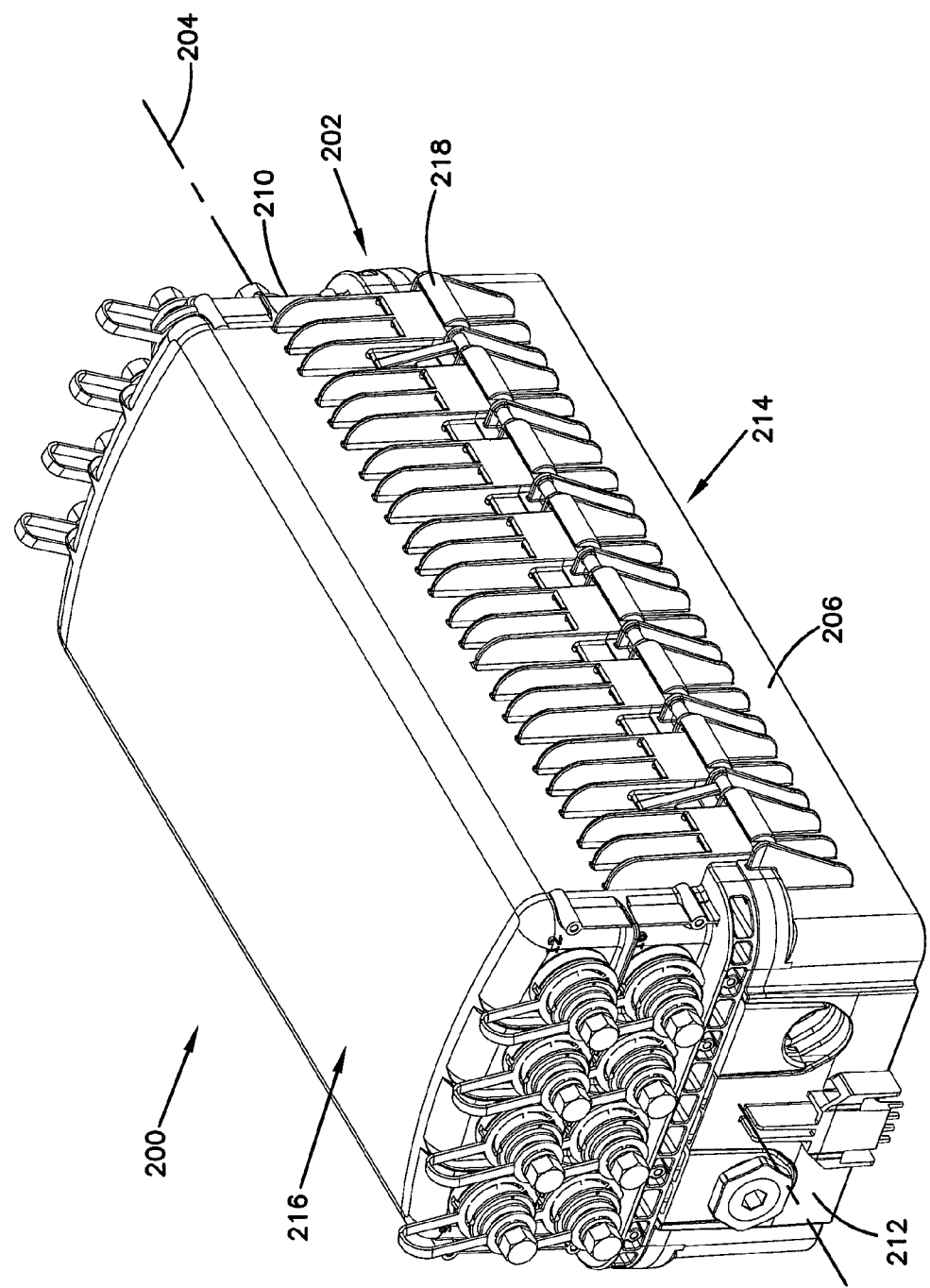
FIG. 4 is a perspective view of a second end of the enclosure of FIG. 3.

Referring now to FIGS. 3 and 4, an enclosure assembly, generally designated 200, is shown. The enclosure assembly 200 includes an enclosure 202. In one aspect of the present disclosure, the enclosure 202 is generally rectangular in shape and defines a longitudinal axis 204 that extends through the center of the enclosure 202 in a longitudinal direction. The enclosure 202 includes a first side 206 and an oppositely disposed second side 208 where the first and second sides 206, 208 are generally parallel to the longitudinal axis 204. The enclosure 202 further includes a first end 210 and an oppositely disposed second end 212. The first and second ends 210, 212 are generally perpendicular to the longitudinal axis 204 and extend between the first and second sides 206, 208.

In one aspect of the present disclosure, the enclosure 202 includes a base 214 and a cover 216 mounted to the base 214. In the depicted example of FIG. 4, the cover 216 is pivotally mounted to the base 214 by hinges 218 disposed on the first side 206 of the enclosure 202. A plurality of latches 220 is disposed on the second side 208 of the enclosure 202. The plurality of latches 220 is adapted to secure the cover 216 in a closed position relative to the base 214.

The enclosure 202 includes at least one adapter mounting portion 222. In one aspect of the present disclosure, the adapter mounting portion 222 is disposed on at least one of the first end 210 and the second end 212 of the enclosure 202. In another aspect of the present disclosure, each of the first and second ends 210, 212 of the enclosure 202 include the adapter mounting portion 222. In another aspect of the present disclosure, the adapter mounting portions 222 are disposed on the cover 216 of the enclosure.

The adapter mounting portion 222 includes a plurality of adapters mounting openings 224. Each of the plurality of adapter mounting openings 224 is adapted to receive a fiber optic cable port 226. In one embodiment, the fiber optic cable port 226 is a fiber optic adapter.

Figure 5:
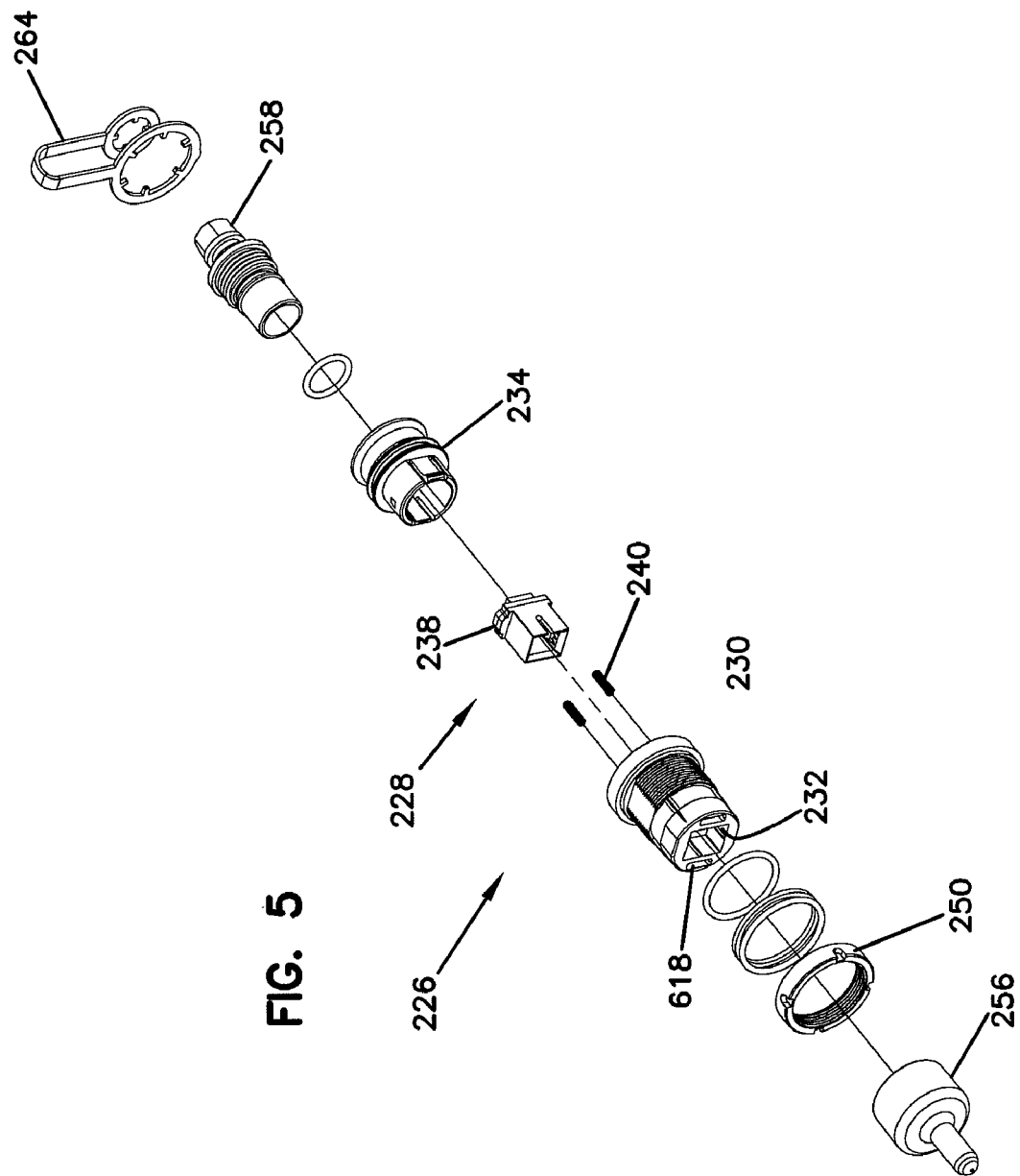
FIG. 5 is an exploded perspective view of a fiber optic adapter suitable for use in the enclosure of FIG. 3.
Figure 6:
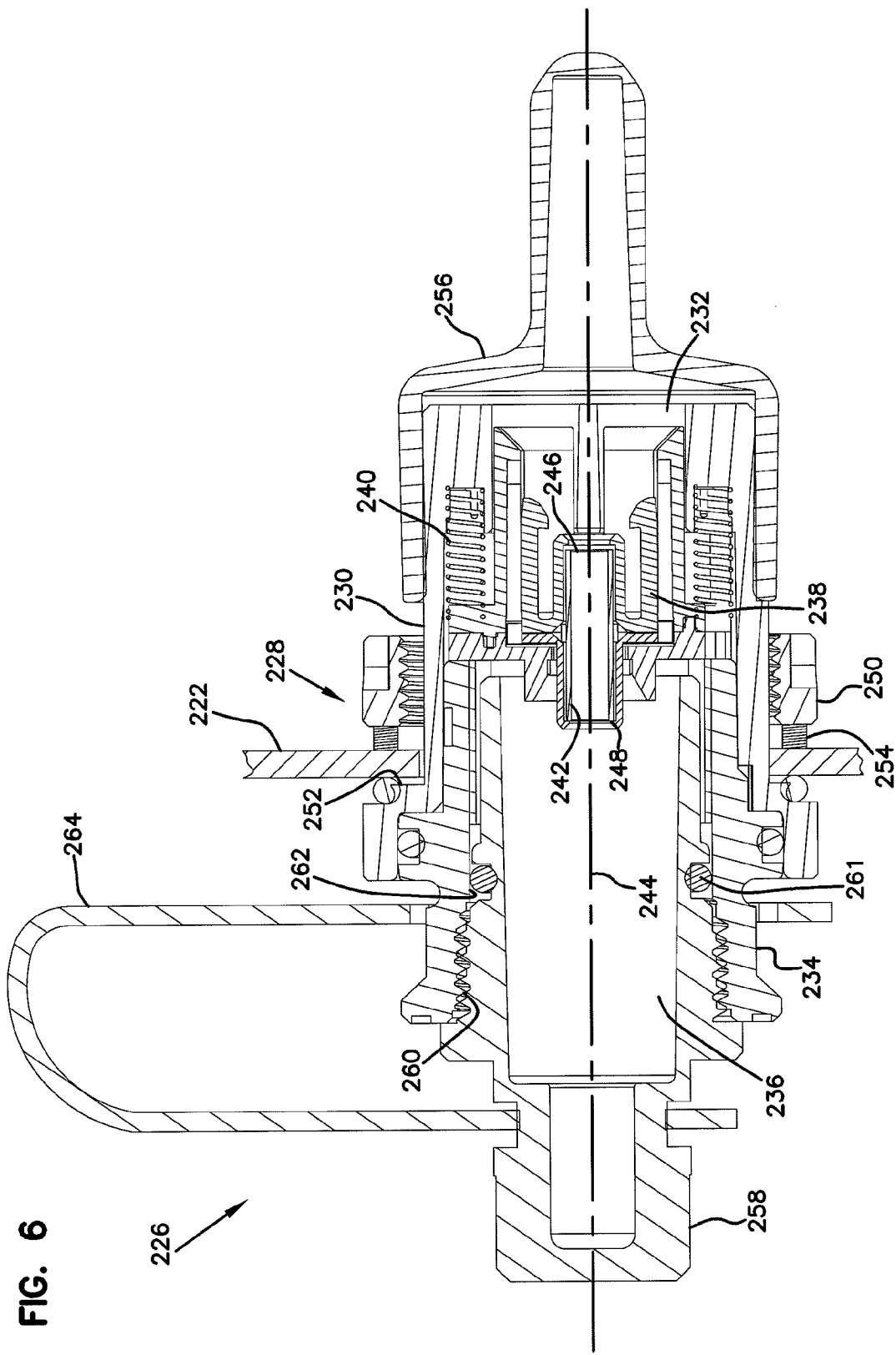
FIG. 6 is a cross-sectional view of the fiber optic adapter of FIG. 5.

Referring now to FIGS. 5 and 6, an example of the fiber optic adapter 226 that is suitable for use with the enclosure 202 is shown. The fiber optic adapter 226 includes a main housing 228 having a first piece 230 that defines an inner port 232 of the fiber optic adapter 226 and a second piece 234 that defines an outer port 236 of the fiber optic adapter 226. The first and second pieces 230, 234 can be interconnected by a snap-fit connection to form the main housing 228. A split sleeve housing 238 mounts within the interior of the main housing 228. Springs 240 bias the split sleeve housing 238 toward the outer port 236 and allow the split sleeve housing 238 to float within the interior of the main housing 228. As shown in FIG. 5, the split sleeve housing 238 houses a standard split sleeve 242 that is coaxially aligned with a center axis 244 of the fiber optic adapter 226. The split sleeve 242 includes a first end 246 that faces toward the inner port 232 of the fiber optic adapter 226 and a second end 248 that faces toward the outer port 236 of the fiber optic adapter 226.

The fiber optic adapter 226 mounts within one of the adapter mounting openings 224 defined by the enclosure 202. The fiber optic adapter 226 is retained within the adapter mounting opening 224 by a retention nut 250 threaded on exterior threads defined by the first piece 230 of the main housing 228. When the retention nut 250 is threaded into place, the corresponding adapter mounting portion 222 is captured between the retention nut 250 and a shoulder 252 of the main housing 228. A sealing member 254 is compressed between the main housing 228 and the adapter mounting portion 222 to provide an environmental seal about the adapter mounting opening 224.

As shown in FIG. 6, a dust cap 256 is shown mounted covering the inner port 232 of the fiber optic adapter 226 and a plug 258 is shown mounted within the outer port 236 of the fiber optic adapter 226. The plug 258 is threaded within internal threads 260 defined within the outer port 236. The plug 258 also includes a sealing member 261 (e.g., an O-ring) that engages a sealing surface 262 within the outer port 236 to provide an environmental seal between the main housing 228 and the plug 258. A strap 264 secures the plug 258 to the main housing 228 to prevent the plug 258 from being misplaced when removed from the outer port 236.

Figure 7:
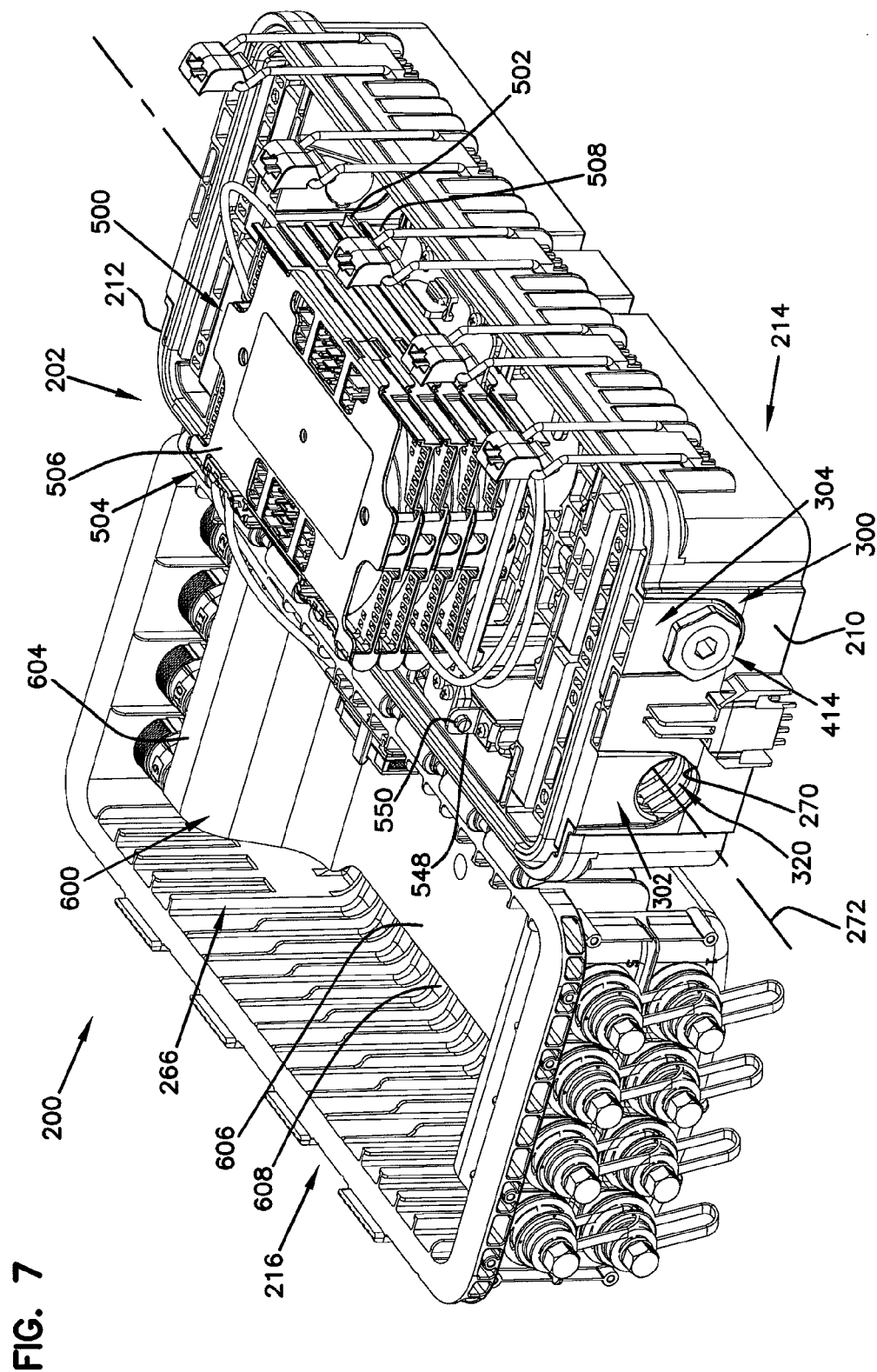
FIG. 7 is a perspective view of the enclosure of FIG. 3 shown in an open position.
Figure 8:
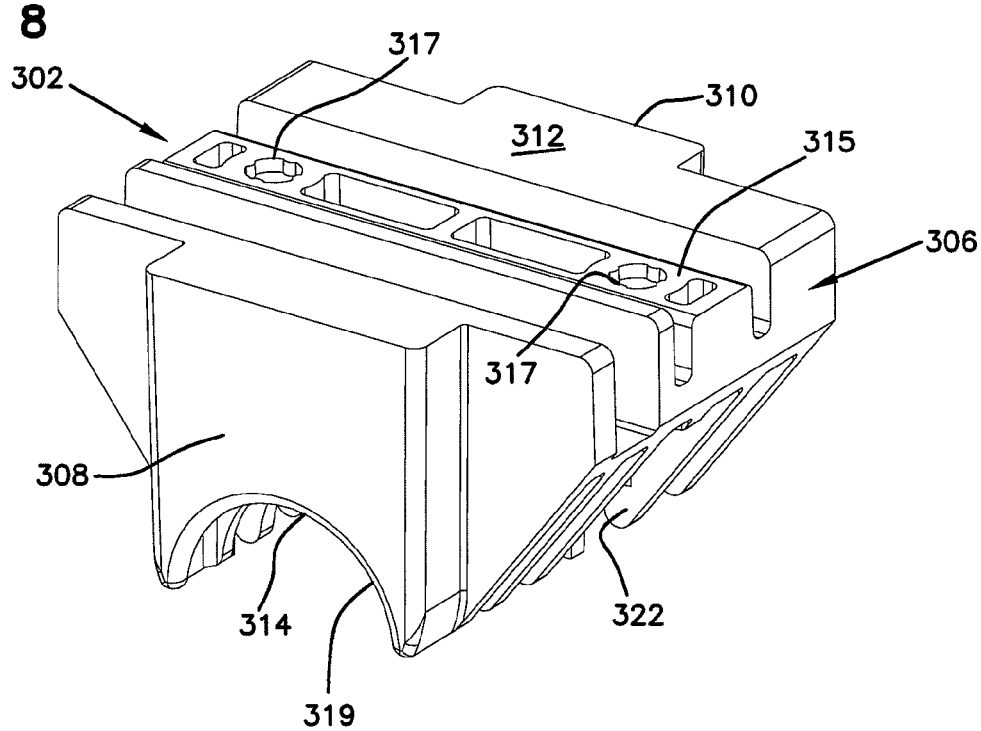
FIG. 8 is a front perspective view of a pass-thru block suitable for use with the enclosure of FIG. 3.
Figure 9:
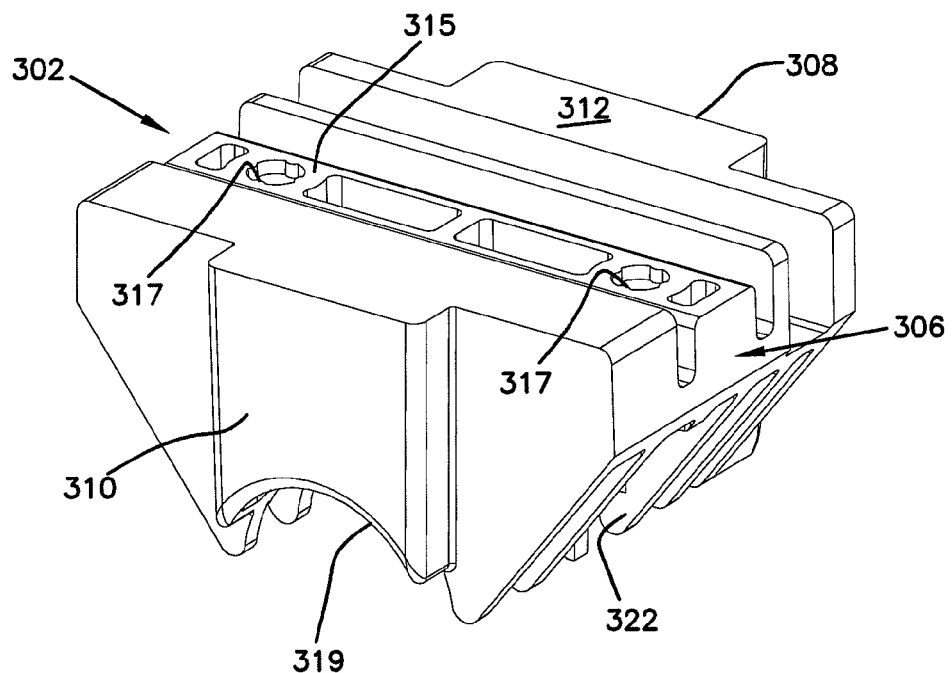
FIG. 9 is a rear perspective view of the pass-thru block of FIG. 8
Figure 11:
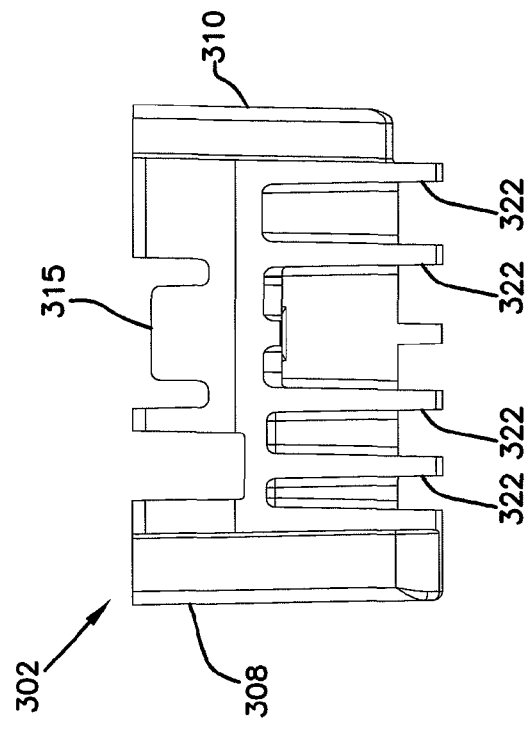
FIG. 11 is a side view of the pass-thru block of FIG. 8.
Figure 10:
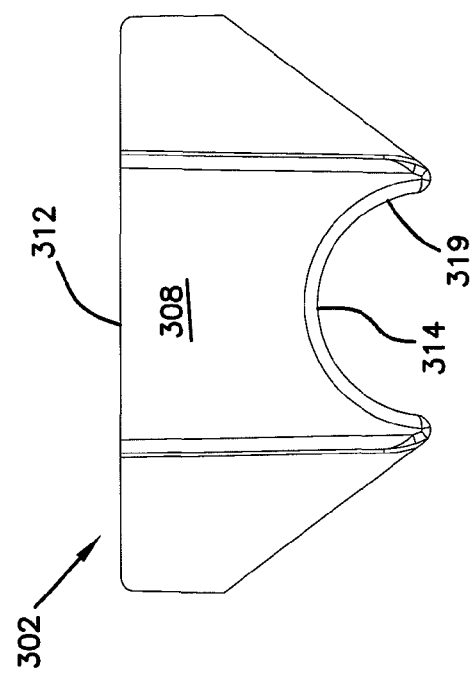
FIG. 10 is front view of the pass-thru block of FIG. 8.
Figure 15:
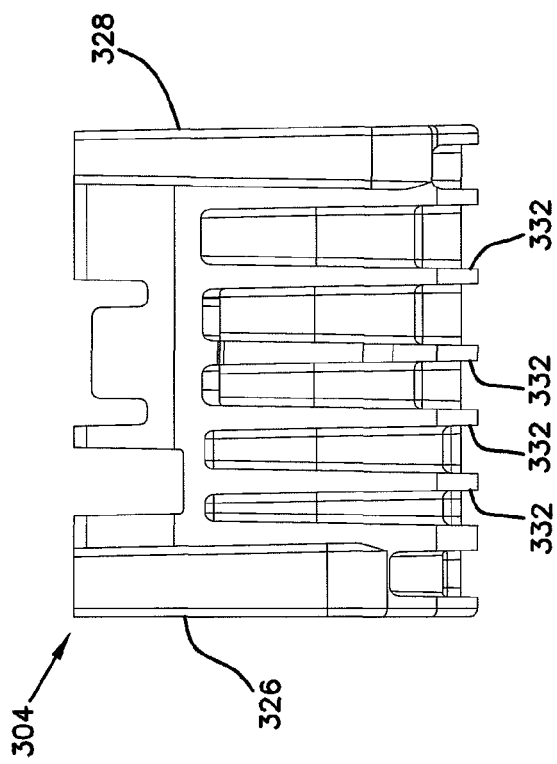
FIG. 15 is a side view of the closure block of FIG. 12.
Figure 14:
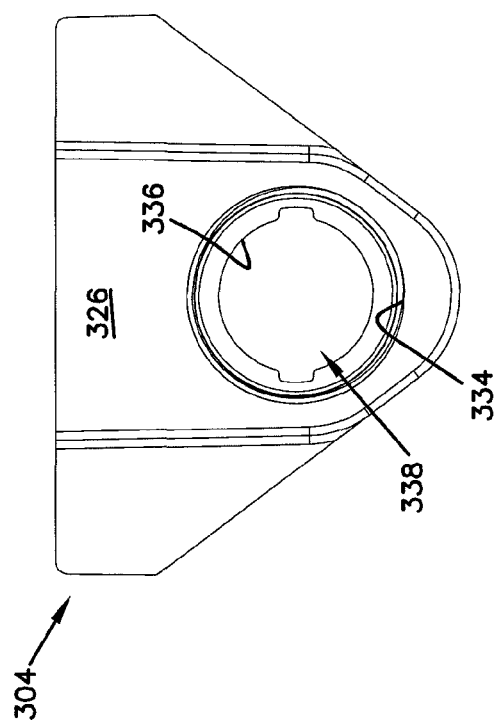
FIG. 14 is a front view of the closure block of FIG. 12.
Figure 16:
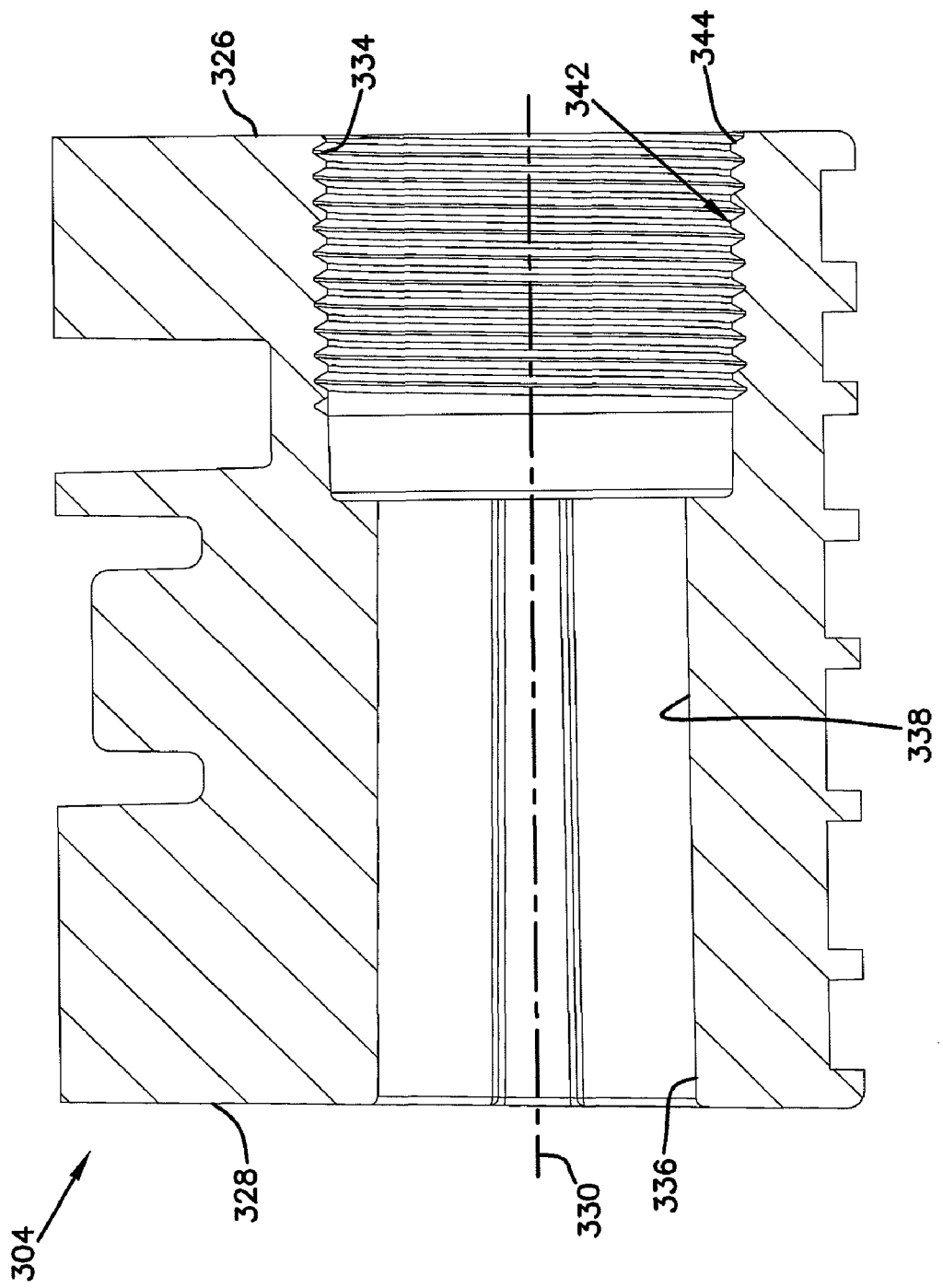
FIG. 16 is a cross-sectional view of the closure block of FIG. 12.

Referring now to FIG. 7, the enclosure 202 is shown in an open position. The base 214 and the cover 216 of the enclosure 202 cooperatively define an interior region 266. With the enclosure 202 in the open position, the interior region 266 is accessible.

The enclosure 202 defines a plurality of cable openings 270 for allowing a telecommunications cable to be routed through the enclosure 202. In one aspect of the present disclosure, the enclosure 202 defines two cable openings 270 on the first end 210 of the enclosure 202 and two cable openings 270 on the second end 212 of the enclosure 202.

Each of the cable openings 270 defines a central axis 272 that extends through the center of the cable opening 270 between the first and second ends 210, 212 of the enclosure 202. The central axes 272 of the cable openings 270 defined by the first end 210 of the enclosure 202 are axially aligned with the cable axes 272 of the cable openings defined by the second end 212. The alignment of the cable openings 270 provides first and second cable pass-thru paths that extend through the enclosure 202.

Figure 28:
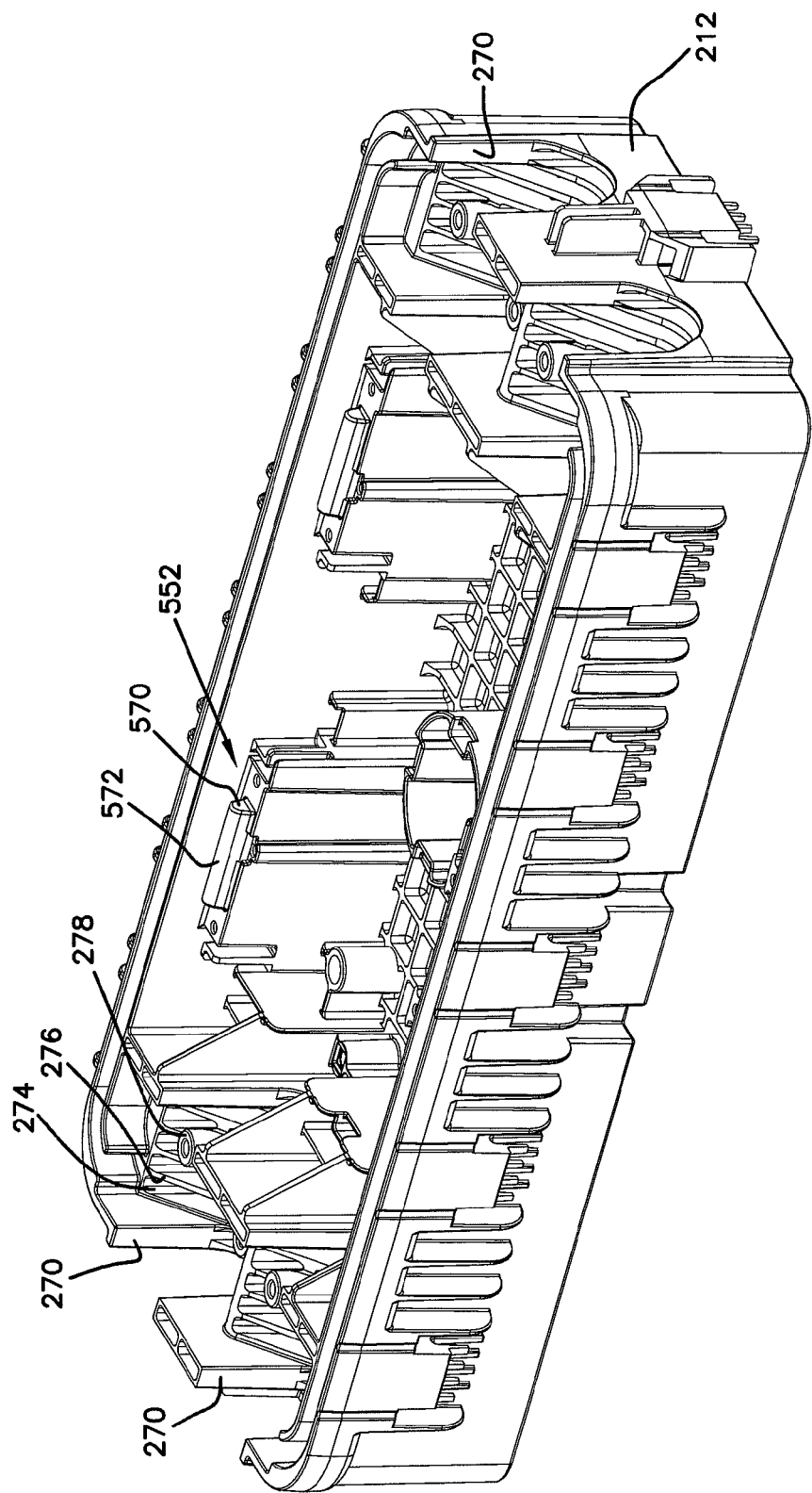
FIG. 28 is a perspective view of a base suitable for use with the enclosure of FIG. 3.
Figure 29:
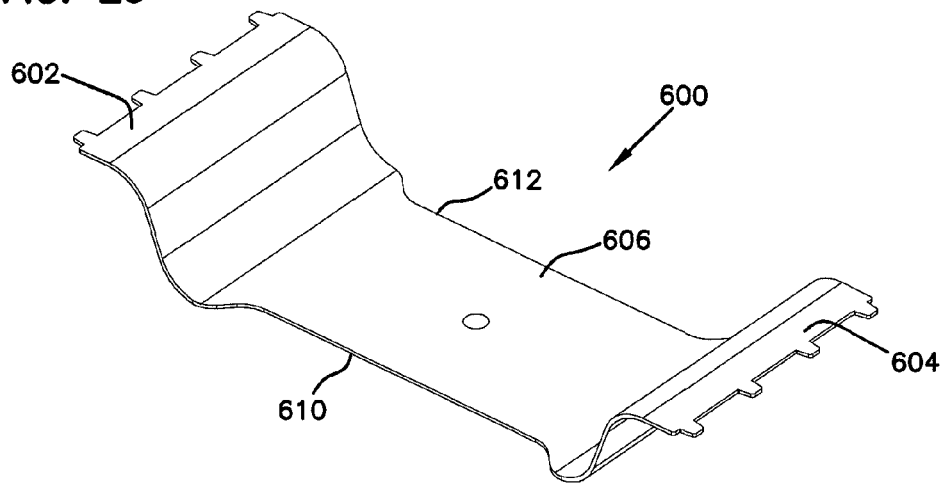
FIG. 29 is a perspective view of a cable cover suitable for use with the enclosure of FIG. 3.
Figure 30:
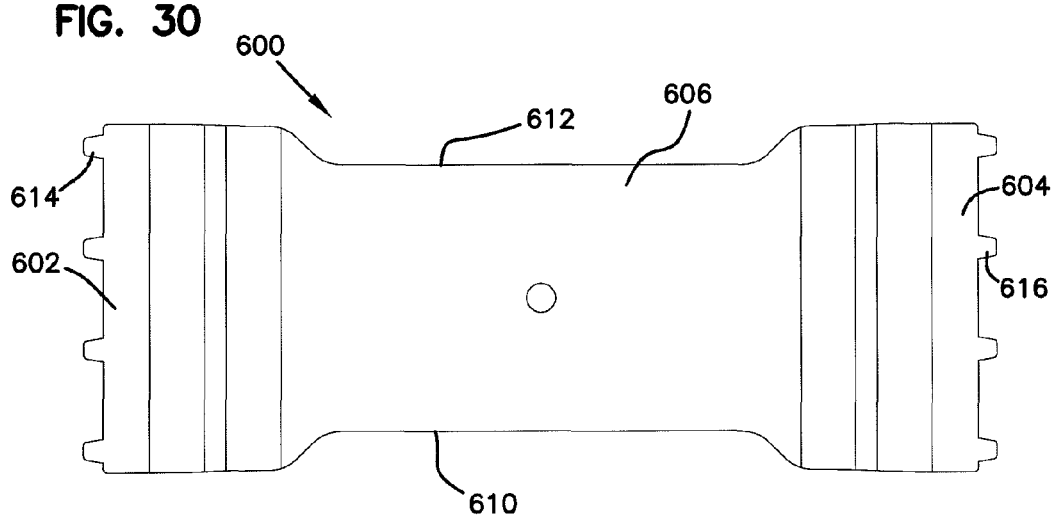
FIG. 30 is a top view of the cable cover of FIG. 29.
Figure 31:
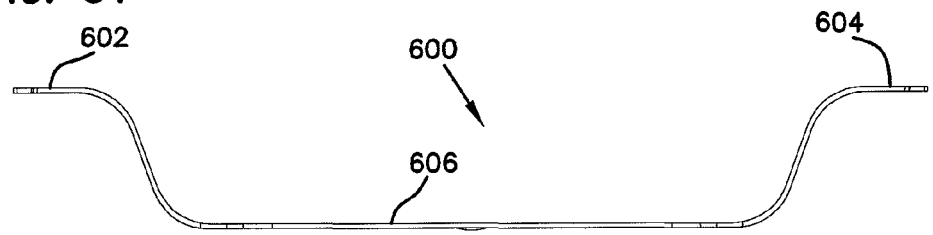
FIG. 31 is a side view of the cable cover of FIG. 29.
Figure 32:
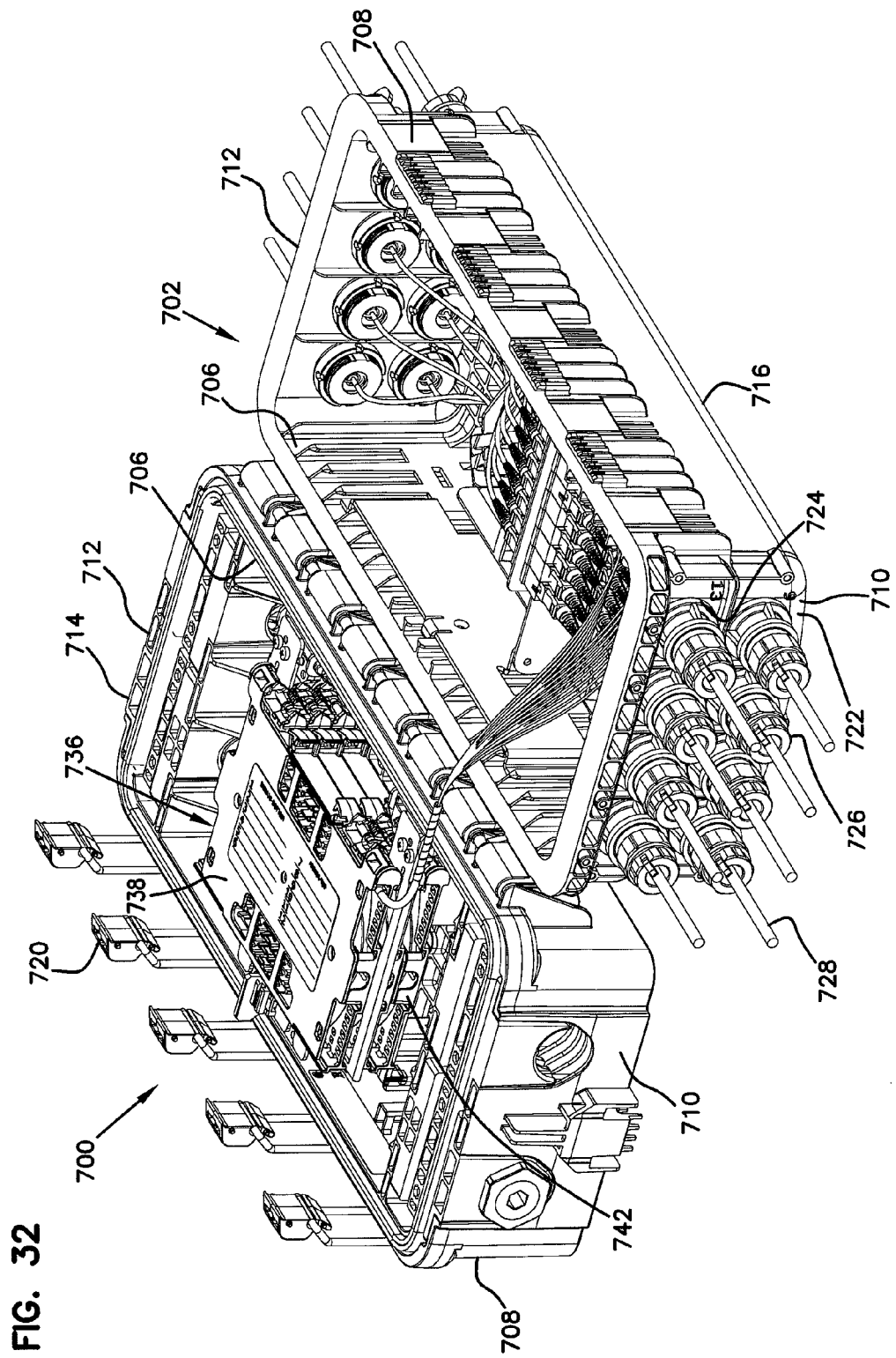
FIG. 32 is a perspective view of an alternate embodiment of an enclosure shown in an open position.
Figure 33:
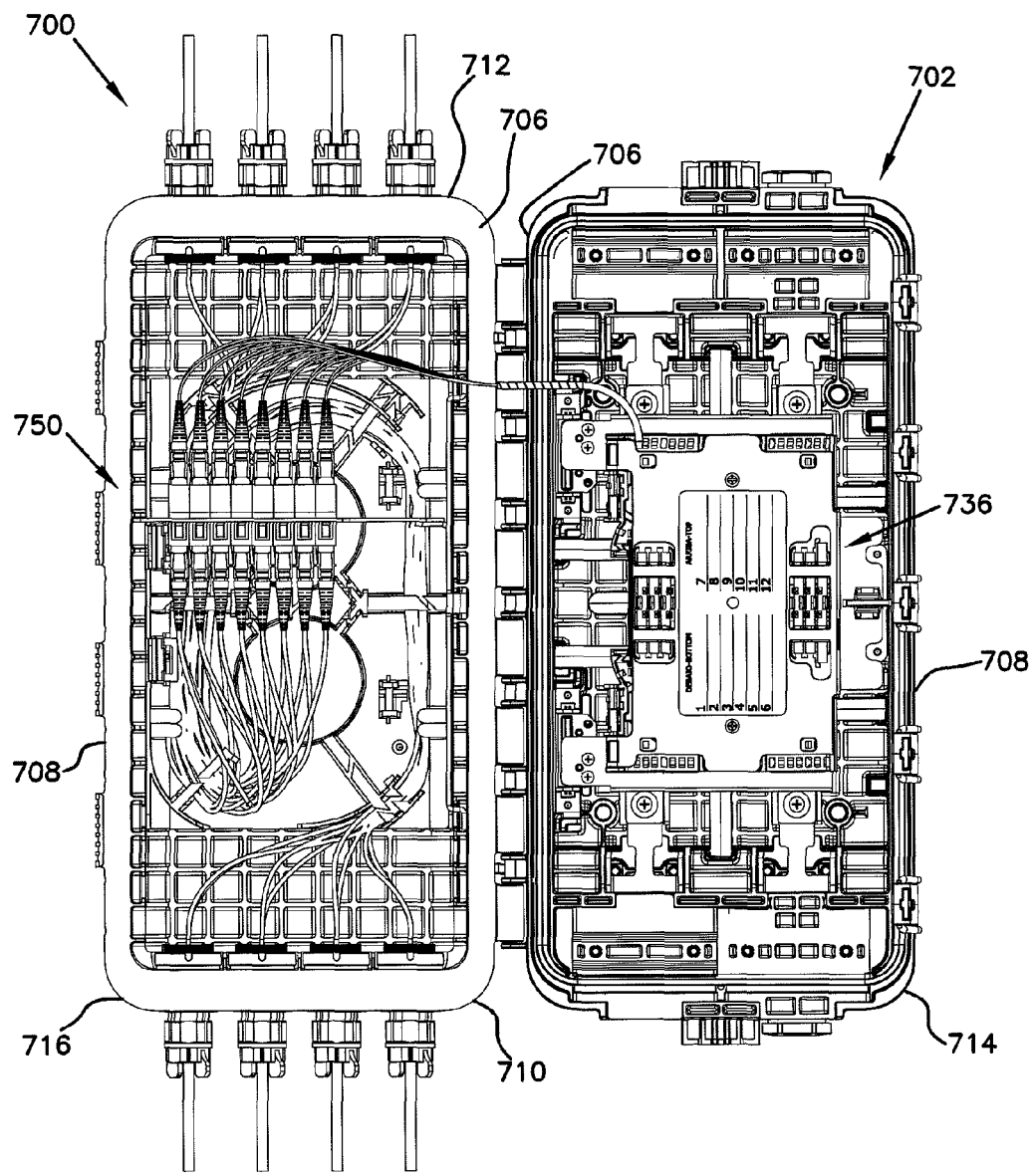
FIG. 33 is a top view of the enclosure of FIG. 32.
Figure 34:
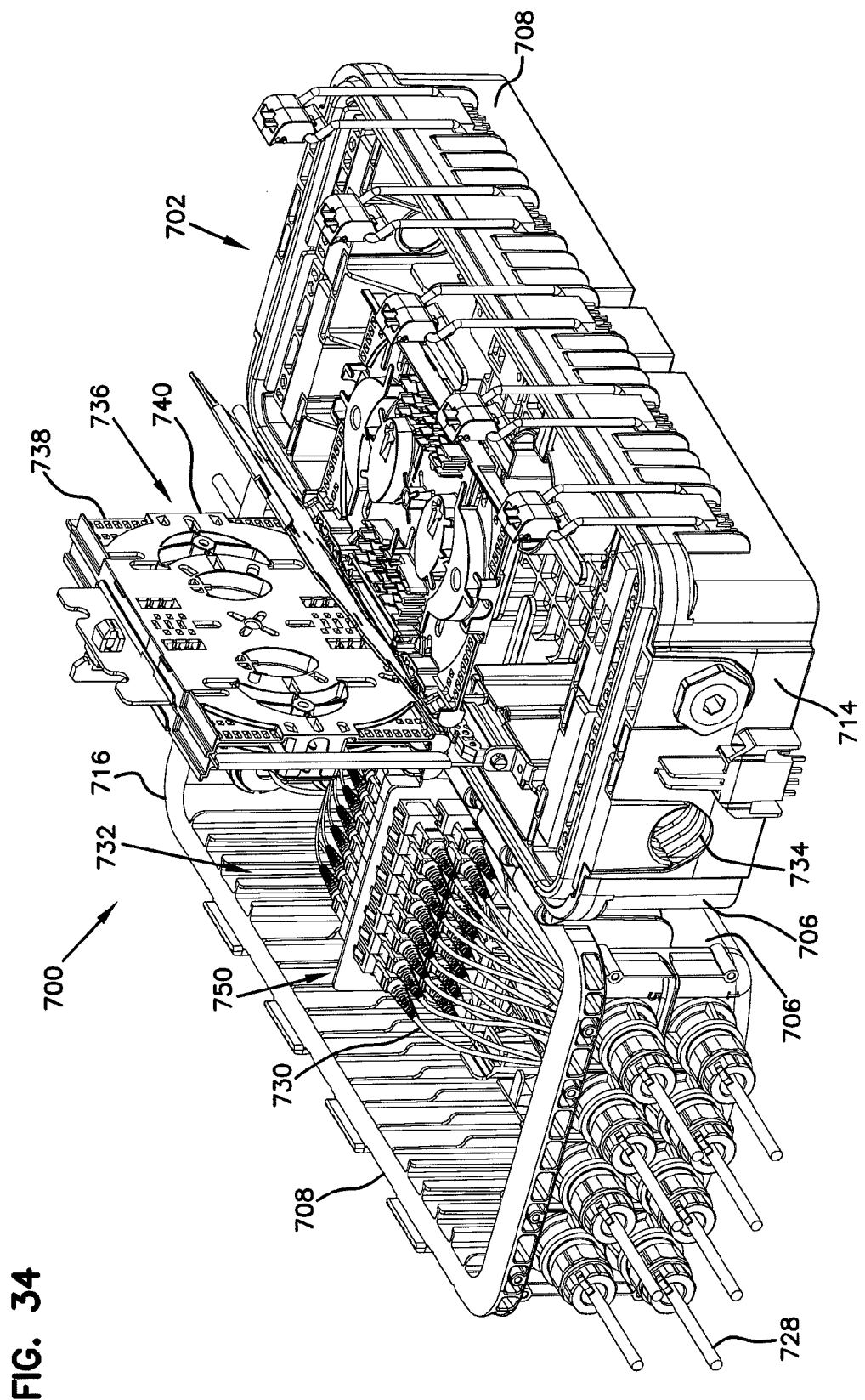
FIG. 34 is a perspective view of the enclosure of FIG. 32 with a tray stack shown in an open position.
Figure 35:
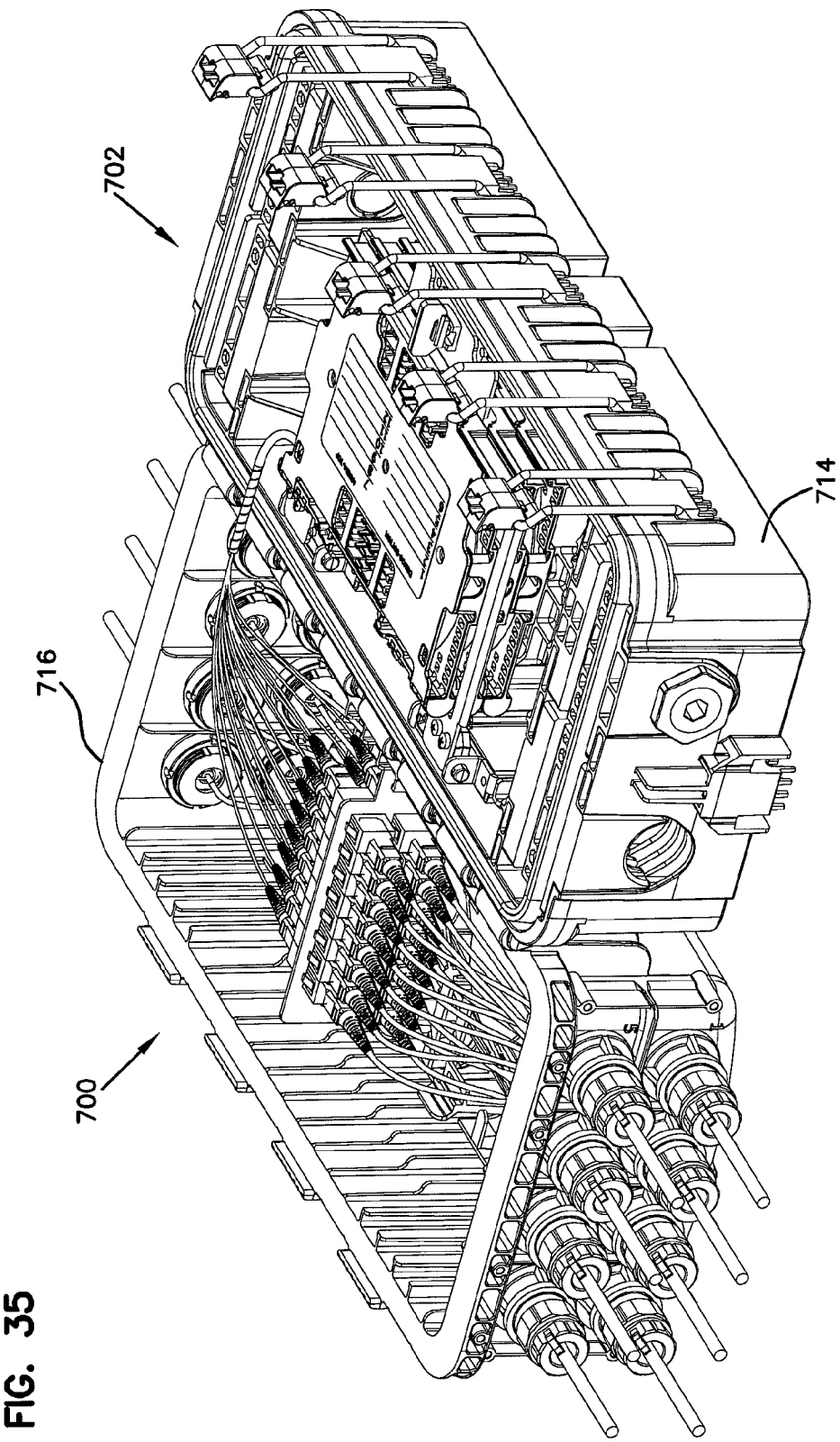
FIG. 35 is another perspective view of the enclosure of FIG. 32.
Figure 36:
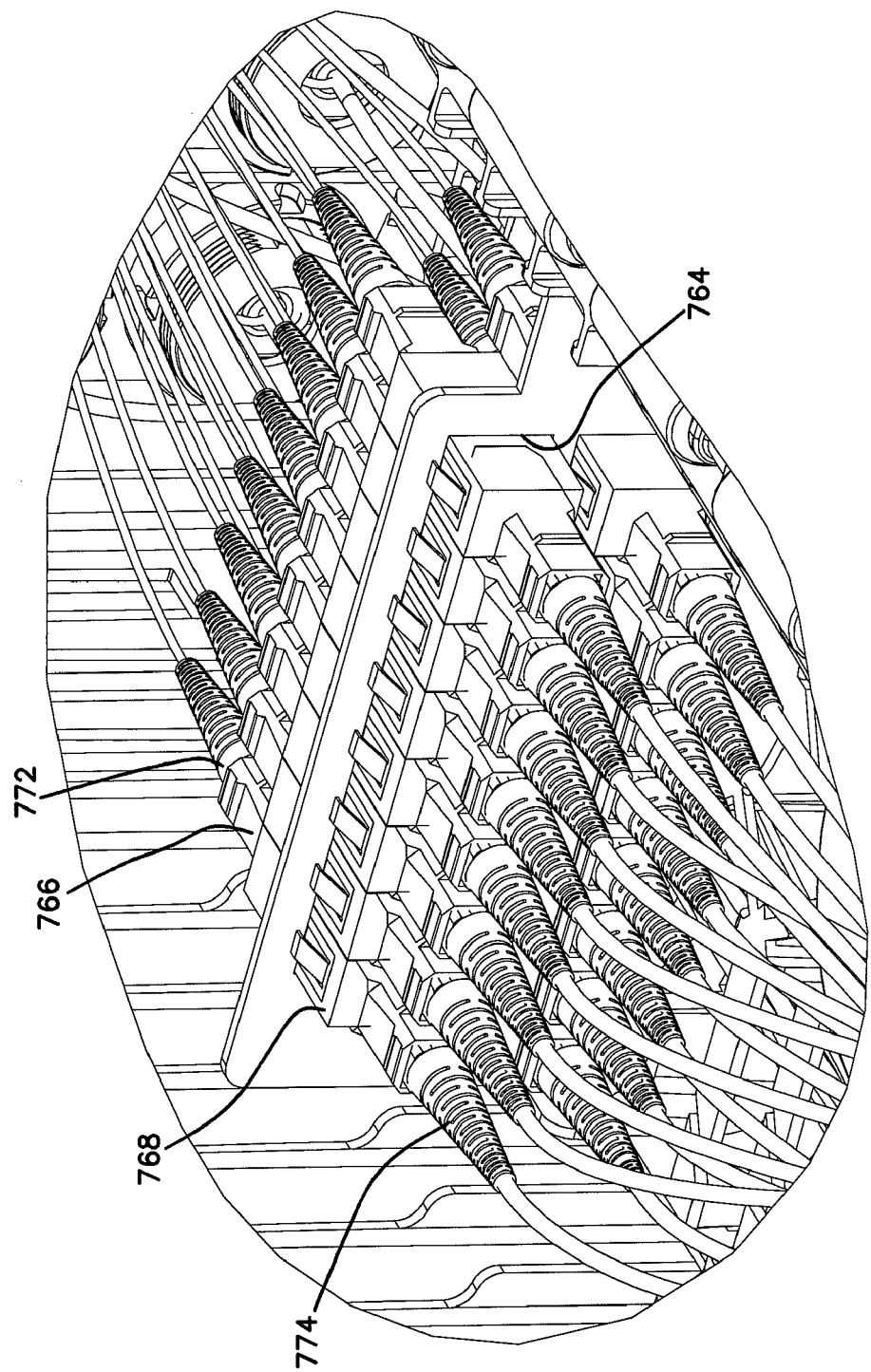
FIG. 36 is a fragmentary perspective view of an adapter plate assembly of the enclosure of FIG. 35.
Figure 37:
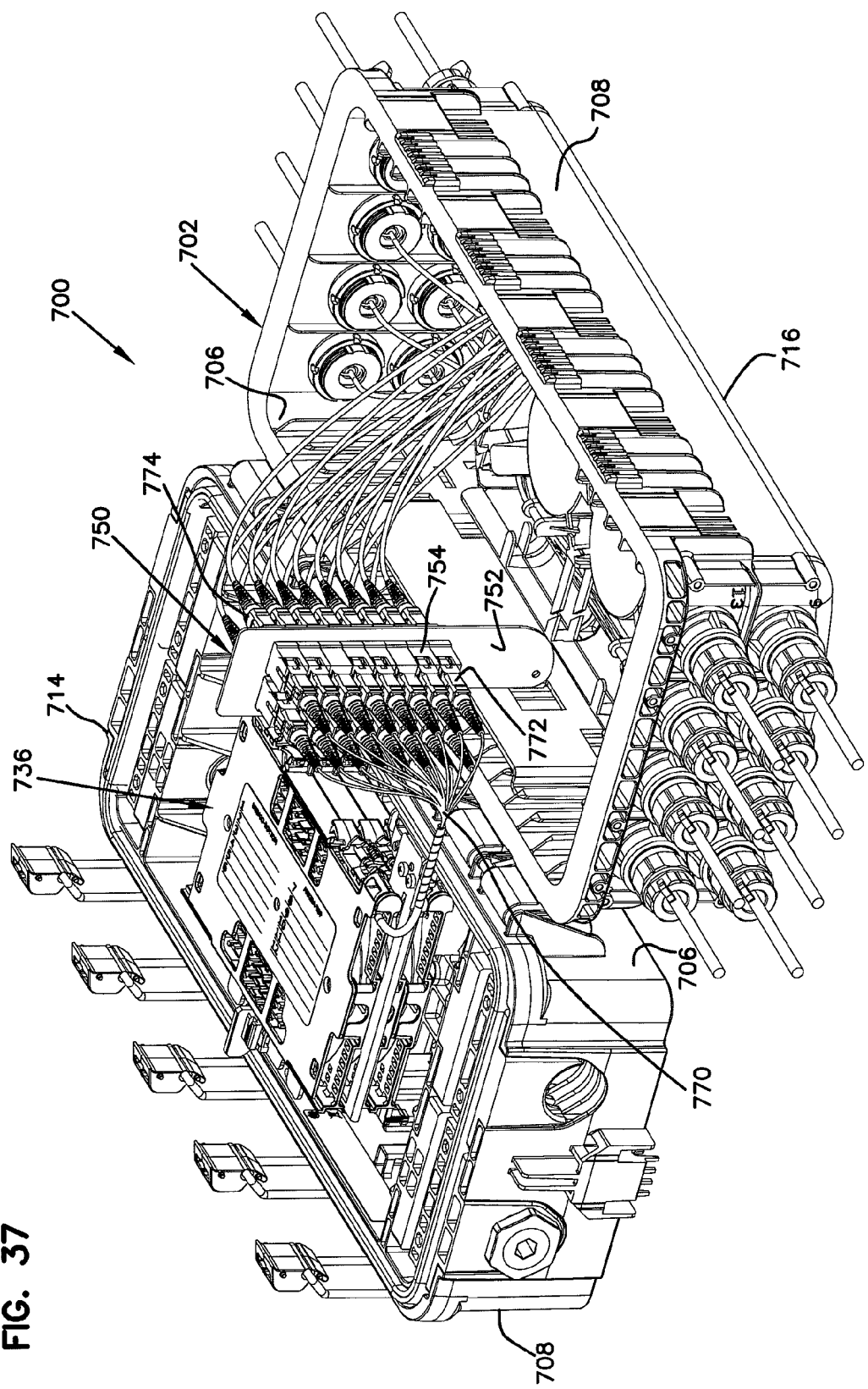
FIG. 37 is a perspective view of the enclosure of FIG. 32 with the adapter plate assembly shown in an open position.

The enclosure 202 defines a plurality of grooves 274 (shown in FIG. 28) disposed adjacent to each of the cable openings 270. Each of the plurality of grooves 274 is axially offset from an adjacent groove 274. In one aspect of the present disclosure, each of the plurality of grooves 274 is separated from an adjacent groove 274 by a wall 276 (shown in FIG. 28).

In one aspect of the present disclosure, the enclosure 202 includes a plurality of mounts 278 (shown in FIG. 28) disposed adjacent to each of the cable openings 270. Each of the plurality of mounts 278 is adapted to receive a fastener.

Referring now to FIGS. 7-15, a cable sealing system, generally designated 300, is shown. The cable sealing system 300 is adapted for selective engagement with the cable openings 270 of the enclosure 202 to allow various fiber optic cables to enter/exit the cable openings 270 of the enclosure 202 or to seal the cable openings 270 when a fiber optic cable is not routed through the cable openings 270. The cable sealing system 300 includes a pass-thru block 302 (shown in FIG. 8) and a closure block 304 (shown in FIG. 9).

Referring now to FIGS. 8-11, the pass-thru block 302 is shown. The pass-thru-block 302 includes a body 306 having a first surface 308 and an oppositely disposed second surface 310. In one aspect of the present disclosure, the first surface 308 and the second surface 310 are generally parallel. The body 306 further includes an upper surface 312 that extends between the first and second surfaces 308, 310 and an oppositely disposed lower surface 314.

The upper surface 312 of the pass-thru block 302 defines a mounting groove 315. In one aspect of the present disclosure, the mounting groove 315 extends across the upper surface 312 in a direction that is generally parallel to the first and second surfaces 308, 310. The mounting groove 315 is adapted to receive a bar. The bar is adapted to retain the pass-thru block 302 in the cable opening 270.

A plurality of mount openings 317 is disposed in the mounting groove 315. The plurality of mount openings 317 is adapted for alignment with the mounts 278 of the enclosure 202. The plurality of mount openings 317 is adapted to receive a plurality of fasteners that pass through the bar.

The lower surface 314 of the pass-thru block 302 defines a recess 319. In one aspect of the present disclosure, the recess 319 is generally arcuate in shape. In another aspect of the present disclosure, the recess 319 is partially cylindrical in shape. The recess 319 is adapted to cooperate with the cable opening 270 to define a cable pass-thru 320 (shown in FIG. 7) through which a fiber optic cable can enter or exit the interior region 266 of the enclosure 202. In one aspect of the present disclosure, the fiber optic cable is inserted through the cable pass-thru 320 such that a portion of an outer surface of the fiber optic cable is in contact with the recess 319 of the pass-thru block 302. In another aspect of the present disclosure, the portion of the fiber optic cable that is inserted in the cable pass-thru 320 may be coated or surrounded with an adhesive (e.g., sealant, gel, glue, tape, mastic tape, etc.) to reduce the risk of leakage between the outer surface of the fiber optic cable and the cable pass-thru 320.

In the depicted example of FIGS. 8-11, the pass-thru block 302 includes a plurality of projections 322 that extend outwardly from the lower surface 314 at a location adjacent to the recess 319. In one aspect of the present disclosure, the plurality of projections 322 is generally parallel to the first and second surfaces 308, 310. The plurality of projections 322 is adapted for engagement in the plurality of grooves 274 of the cable opening 270. In one aspect of the present disclosure, the plurality of projections 322 is adapted for sealing engagement with the plurality of walls 276 separating adjacent groove 274.

Referring now to FIG. 12-16, the closure block 304 is shown. The closure block 304 includes a body 324. The body 324 includes a first face 326 and an oppositely disposed second face 328. In one aspect of the present disclosure, the first face 326 and the second face 328 are generally parallel. The body 324 defines a longitudinal axis 330 that extends from the first face 326 to the second face 328 and is generally perpendicular to the first face 326.

In one aspect of the present disclosure, the body 324 includes a plurality of fins 332 that extend outwardly from the body 324. In one aspect of the present disclosure, the plurality of fins 332 is generally perpendicular to the longitudinal axis 330. In another aspect of the present disclosure, the plurality of fins 332 is generally parallel to the first face 326 of the body 324. The plurality of fins 332 is adapted for engagement with the plurality of grooves 274 of the enclosure 202. In one aspect of the present disclosure, the plurality of fins 332 is adapted for sealing engagement with the plurality of grooves 274 of the enclosure 202.

The body 324 defines a first opening 334 on the first face 326 and a second opening 336 on the second face 328. A bore 338 extends between the first and second openings 334, 336.

The bore 338 is generally parallel to the longitudinal axis 330 of the body 324. In one aspect of the present disclosure, the bore 338 is generally aligned with the longitudinal axis 330 of the body 324. The bore 338 includes an inner surface 340. The inner surface 340 of the bore 338 includes a threaded portion 342. The threaded portion 342 is disposed adjacent to the first opening 334 and includes a plurality of internal threads 344. The plurality of internal threads 344 is adapted for threaded engagement with a fitting, generally designated 346. In one aspect of the present disclosure, a fitting suitable for use with the closure block 304 is sold by Sealcon of Centennial, Colo. and has a part number of CD25DR-BK.

Figure 17:
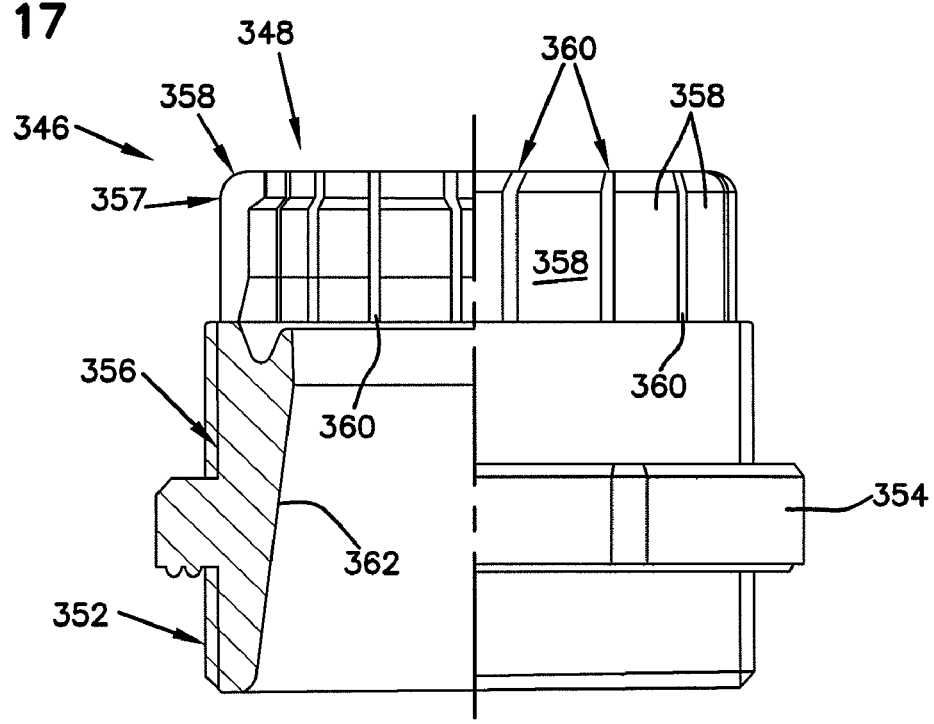
FIG. 17 is a perspective view of a sleeve of a fitting suitable for use with the enclosure of FIG. 3.
Figure 18:
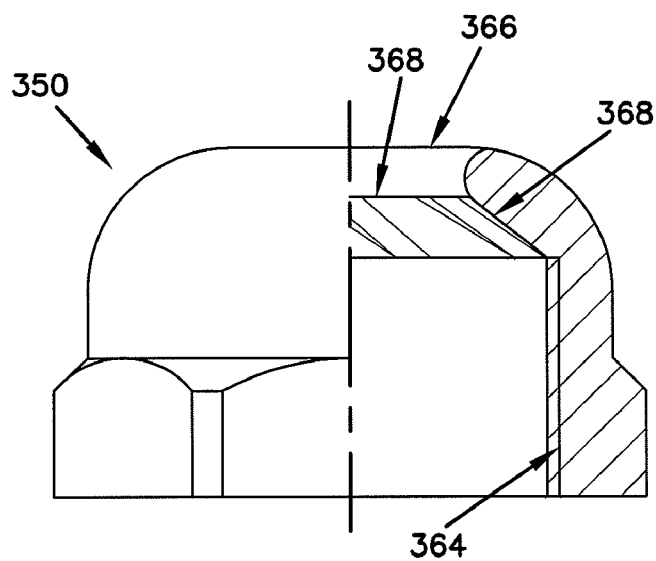
FIG. 18 is a perspective view of a nut for the fitting of FIG. 17.

Referring now to FIGS. 17 and 18, the fitting 346 includes a sleeve 348 and a nut 350. The sleeve 348 includes an externally threaded first end portion 352, a hexagonal collar 354, an externally threaded intermediate portion 356 and a second end portion 357 consisting of an annulus of axially parallel deformable prongs 358 alternating with axially extending slots 360. The sleeve 348 further defines a central passage 362 that extends longitudinally through the sleeve 348. The threaded first end portion 352 of the sleeve 348 is adapted for threaded engagement with the threaded portion 342 of the bore 338 of the closure block 304.

The nut 350 of the fitting 346 includes a threaded first end 364 and a second end 366 having a deforming surface 368. The deforming surface 368 is adapted to deform the deformable prongs 358 of the sleeve 348 when the first end 364 of the nut 350 is threadedly engaged with the intermediate portion 356 of the sleeve 348. The fitting 346 is described in greater detail in U.S. Pat. No. 5,048,872, the disclosure of which is hereby incorporated by reference in its entirety.

Figure 19:
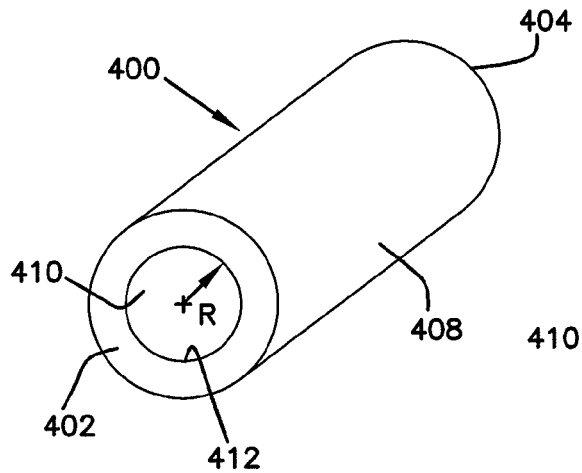
FIG. 19 is a perspective view of a grommet suitable for use with the enclosure of FIG. 3.
Figure 20:
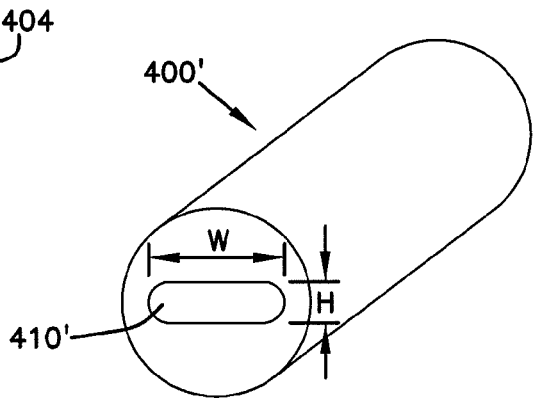
FIG. 20 is a perspective view of an alternate embodiment of a grommet suitable for use with the enclosure of FIG. 3.
Figure 21:
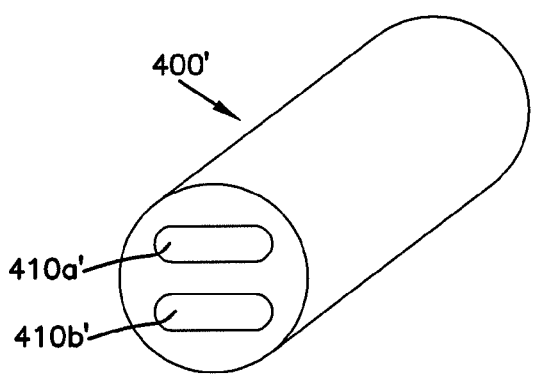
FIG. 21 is a perspective view of an alternate embodiment of the grommet of FIG. 20.

Referring now to FIGS. 19-21, the central passage 362 of the fitting 346 is adapted to receive a grommet 400. In the depicted example of FIG. 19, the grommet 400 is generally cylindrical in shape and includes a front surface 402 and an oppositely disposed rear surface 404. The grommet 400 defines a central longitudinal axis 406 that extends between the front surface 402 and the rear surface 404 and is generally perpendicular to the front and rear surfaces 402, 404. The grommet 400 further includes an outer surface 408 that extends between the front and rear surfaces 402, 404.

The grommet 400 defines a cable passage 410 having an interior surface 412. In the depicted example of FIG. 19, the cable passage 410 defines a radius R such that the cable passage 410 is generally cylindrical in shape.

In the depicted example of FIG. 20, an alternate embodiment of a grommet 400' is shown. The grommet 400' includes a cable passage 410' that is generally oval in shape. In the depicted example of FIG. 20, the cable passage 410' includes a width W that is greater than a height H. The cable passage 410' is suitable for use with generally flat fiber optic cables.

In the depicted example of FIG. 21, the grommet 400' includes a first cable passage 410a' and a second cable passage 410b'. In the depicted example of FIG. 21, each of the first and second cable passages 410a', 410b' is generally oval in shape.

In use, a fiber optic cable is inserted into the cable passage 410 of the grommet 400 such that an outer surface of the fiber optic cable is in contact with the interior surface 412 of the grommet 400. The grommet 400 is inserted into the central passage 362 of the fitting 346 such that the outer surface 408 of the grommet 400 is in contact with the central passage 362 of the fitting 346. In one aspect of the present disclosure, the interior surface 412 of the grommet 400 is adapted for sealing contact with the outer surface of the fiber optic cable while the outer surface 408 of the grommet 400 is adapted for sealing contact with the central passage 362 of the fitting 346.

Figure 22:
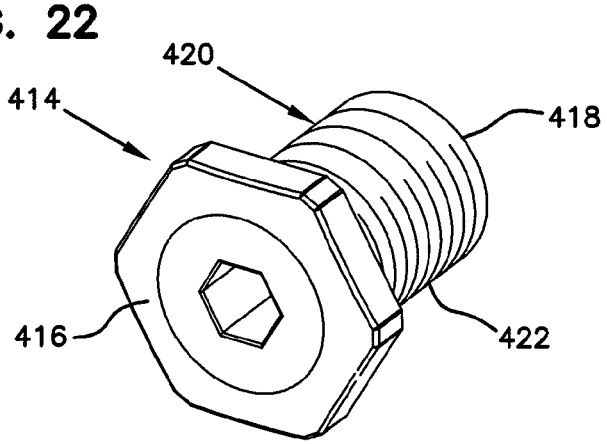
FIG. 22 is a perspective view of a plug suitable for use with the enclosure of FIG. 3.

Referring now to FIG. 22, a plug 414 is shown. The plug 414 is adapted to be received in bore 338 of the closure block 304. The plug 414 includes a front face 416 and an oppositely disposed rear face 418. In one aspect of the present disclosure, the plug 414 is solid. It will be understood that the term "solid" as used in the present disclosure means that the plug 414 does not include a passage that extends through the first and second faces 416, 418 of the plug 414.

The plug 414 further includes an exterior surface 420 that extends between the front and rear faces 416, 418. The exterior surface 420 of the plug 414 includes a threaded portion 422 that is adapted for threaded engagement with the threaded portion 342 of the bore 338. As the plug 414 is solid, the bore 338 is blocked from receiving a fiber optic cable when the plug 414 is disposed in the closure block 304.

In one aspect of the present disclosure, the plug 414 and the grommet 400 are interchangeable in the bore 338 of the closure block 304. The interchangeability of the plug 414 and the grommet 400 allow the enclosure 202 to be customizable. For example, if only one of the cable openings 270 on the first end 210 of the enclosure 202 and only one of the cable openings 270 on the second end 212 of the enclosure 202 are used for fiber optic cable to enter/exit the enclosure 202, the other cable openings 270 on the first and second ends 210, 212 can be blocked by plugs 414 disposed in closure blocks 304 (shown in FIG. 7). If, however, an additional fiber optic cable is to be routed from the enclosure 202, the plugs 414 can be removed from the closure blocks 304 disposed in the cable openings 270 of the first and second ends 210, 212 and replaced by grommets 400 having cable passages 410.

In one aspect of the present disclosure, the enclosure assembly 200 includes a cable sealing kit. The cable sealing kit includes two pass-thru blocks 302, two closure blocks 304, two grommets 400 having cable passageways 410 that are cylindrical in shape, two grommets 400 having cable passageways 410' having an oval shape and two plugs 414. In another aspect of the present disclosure, the enclosure assembly 200 includes a cable sealing kit. The cable sealing kit includes two fittings 346, two grommets 400 having cable passageways 410 that are cylindrical in shape and two grommets 400 having cable passageways 410' having an oval shape.

Referring now to FIG. 7, the enclosure assembly 200 includes a tray stack 500 disposed in the interior region 266 of the enclosure 202. The tray stack 500 includes a tray mounting plate assembly 501. The tray mounting plate assembly 501 includes a tray mounting plate 502. A plurality of trays 504 is mounted to the tray mounting plate 502. The tray stack 500 provides a mid-span access location in the enclosure 202 at which optical fibers of the fiber optic cable that are routed through the enclosure 202 can be terminated and/or split. In one aspect of the present disclosure, the plurality of trays 504 includes at least one splice tray 506 and at least one splitter tray 508.

In order to facilitate access to the fiber optic cable and/or the optical fibers routed through the enclosure 202, the tray stack 500 selectively pivots relative to the enclosure 202. In one aspect of the present disclosure, the tray stack 500 selectively pivots between a closed position (shown in FIG. 7) and an open position. In one aspect of the present disclosure, the open position of the tray stack 500 is about 90 degrees from the closed position.

The tray mounting plate 502 of the tray stack 500 is pivotally engaged with the enclosure 202. In one aspect of the present disclosure, the tray mounting plate 502 is pivotally engaged with the first side 206 of the enclosure 202. In another aspect of the present disclosure, the tray mounting plate 502 is pivotally engaged with the base 214 of the enclosure 202.

Figure 23:
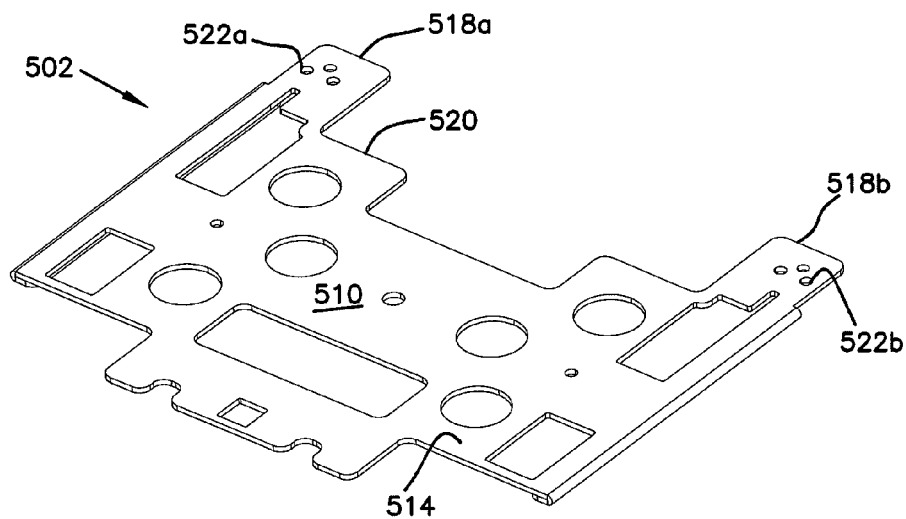
FIG. 23 is a perspective view of a tray mounting plate suitable for use with the enclosure of FIG. 3.
Figure 24:
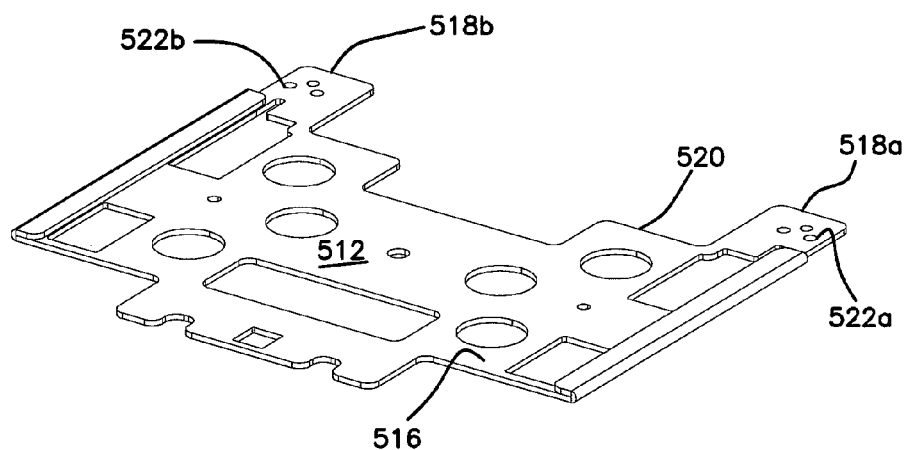
FIG. 24 is another perspective view of the tray mounting plate of FIG. 23.
Figure 25:
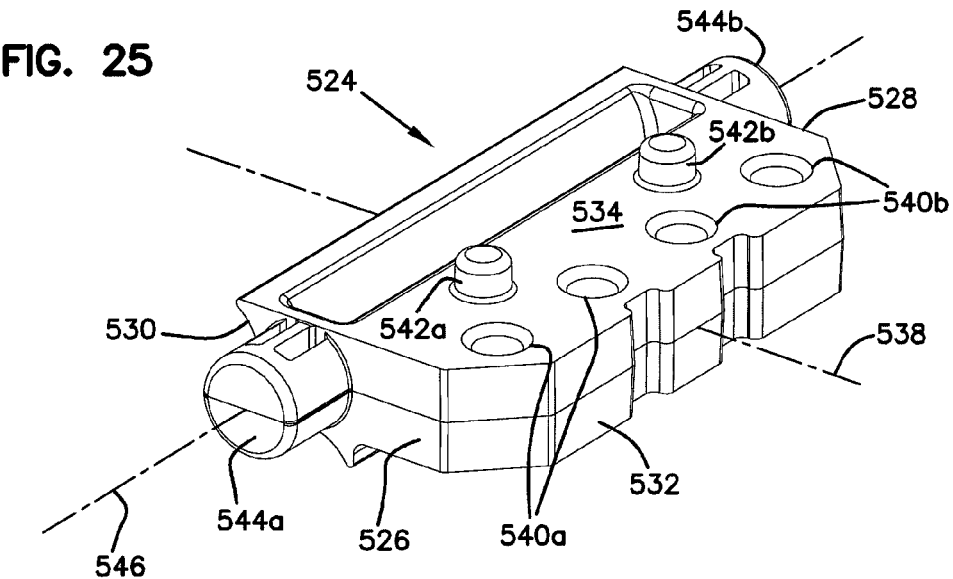
FIG. 25 is a perspective view of a hinge member suitable for use the tray mounting plate of FIG. 23.
Figure 26:
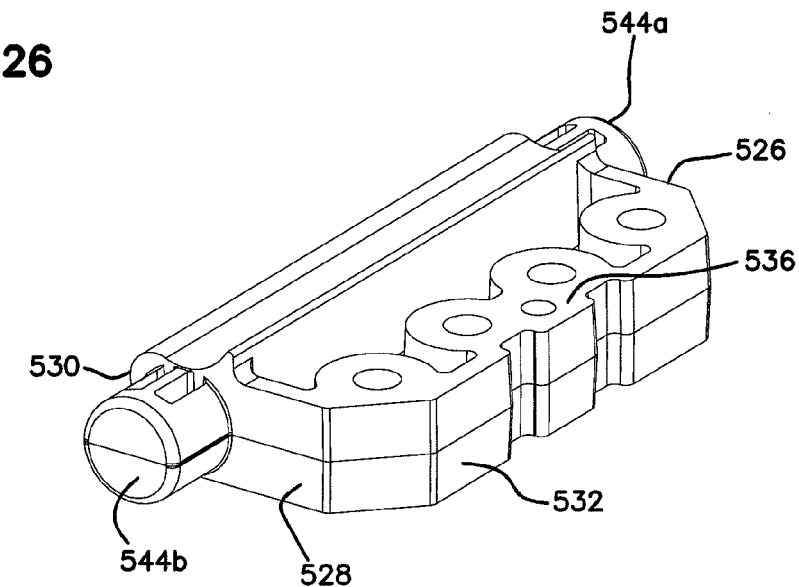
FIG. 26 is another perspective view of the hinge member of FIG. 25.

Referring now to FIGS. 23 and 24, the tray mounting plate 502 is generally planar and includes a top surface 510 and an oppositely disposed bottom surface 512. The top surface 510 defines an upper tray mounting region 514 while the bottom surface 508 defines a lower tray mounting region 516. In one aspect of the present disclosure, at least one splice tray 506 is mounted to the upper tray mounting region 514 while at least one splitter tray 508 is mounted to the lower tray mounting region 516.

The tray mounting plate 502 further includes a first mounting tab 518a and a second mounting tab 518b. The first and second mounting tabs 518a, 518b extend outwardly from a longitudinal edge 520 of the tray mounting plate 502. The first mounting tab 518a defines a first plurality of openings 522a while the second mounting tab 518b defines a second plurality of openings 522b. In one aspect of the present disclosure, each of the first and second plurality of openings 522a, 522b includes three openings.

Referring now to FIGS. 25-28, the tray mounting plate assembly 501 further includes first and second hinge members 524. The first and second mounting tabs 518a, 518b are connected to the first and second hinge members 524. Each of the hinge members 524 includes a first end 526, an oppositely disposed second end 528, a first side 530 that extends between the first and second ends 526, 528, an oppositely disposed second side 532, a superior surface 534 that extends between the first and second ends 526, 528 and the first and second sides 530, 532 and an oppositely disposed inferior surface 536. The hinge member 524 defines a lateral axis 538 that extends between the first and second sides 530, 532. In one aspect of the present disclosure, the hinge member 524 is axisymmetric about the lateral axis 538. The axisymmetry of the hinge member 524 is potentially advantageous as it provides a design for the hinge member 524 that allows the hinge member 524 to be used at different locations.

The superior surface 534 of the hinge member 524 is adapted for engagement with the bottom surface 512 of one of the first and second mounting tabs 518a, 518b of the tray mounting plate 502. The superior surface 534 of the hinge member 524 defines a first plurality of mounting openings 540a and a second plurality of mounting openings 540b and includes a first protrusion 542a and a second protrusion 542b. When the hinge member 524 is engaged with the first mounting tab 518a, the first plurality of mounting openings 540a is aligned with the first plurality of openings 522a of the first mounting tab 518a. When the hinge member 524 is engaged with the second mounting tab 518b, the second plurality of mounting openings 540b is aligned with the second plurality of openings 522b of the second mounting tab 518b. The first protrusion 542a is adapted for insertion into one of the first plurality of openings 522a when the hinge member 524 is engaged with the first mounting tab 518a while the second protrusion 542b is adapted for insertion into one of the second plurality of openings 522b when the hinge member 524 is engaged with the second mounting tab 518b.

In one aspect of the present disclosure, the hinge member 524 includes a first pivot 544a. In the depicted example, the first pivot 544a extends outwardly from the first end 526 of the hinge member 524. In another aspect of the present disclosure, the hinge member 524 includes a second pivot 544b. In the depicted example, the second pivot 544b extends outwardly from the second end 528 of the hinge member 524. The first and second pivots 544a, 544b define a pivot axis 546 about which the hinge member 524 selectively pivots.

The first and second pivots 544a, 544b are supported by a plurality of brackets 548 (shown in FIG. 7). In one aspect of the present disclosure, each of the brackets 548 defines a pivot opening 550 that is adapted to receive one of the first and second pivots 544a, 544b. The brackets 548 are engaged with the enclosure 202. In one aspect of the present disclosure, the brackets 548 are engaged (e.g., by fasteners, bolts, screws, etc.) with a tray mount 552 that is disposed in the interior region 266 of the enclosure. In one aspect of the present disclosure, the tray mount 552 is disposed on the first side 206 of the base 214 of the enclosure 202.

Figure 27:
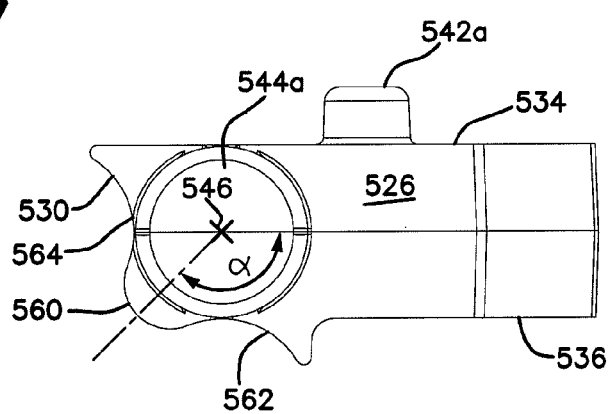
FIG. 27 is a side view of the hinge member of FIG. 25.

The hinge member 524 further includes a detent 560. The detent 560 is a protrusion that extends outwardly from the inferior surface 536 of the hinge member 524. In one aspect of the present disclosure, the detent 560 extends outwardly from the inferior surface 536 at an angle $\alpha$. In another aspect of the present disclosure, the angle $\alpha$ is in the range of about 120 degrees to about 150 degrees. It will be understood that the angle $\alpha$ as used in the present disclosure is measured as shown in FIG. 27. In another aspect of the present disclosure, the angle $\alpha$ is about 135 degrees. The detent 560 of the hinge member 524 separates a first retention portion 562 of the inferior surface 536 of the hinge member 524 from a second retention portion 564 of the first side 530 of the hinge member 524. In the depicted embodiment, each of the first and second retention portions 562, 564 is a recess disposed adjacent to the detent 560. The detent 560 is disposed between the first and second retention portions 562, 564.

The detent 560 is adapted for engagement with a protrusion 570 that extends outwardly from the tray mount 552 disposed in the interior region 266 of the base 214. In one aspect of the present disclosure, the protrusion 570 includes a semi-cylindrical surface 572. With the tray stack 500 in the open position, the semi-cylindrical surface 572 of the protrusion 570 of the tray mount 552 is disposed in the second retention portion 564 of the first side 530 of the hinge member 524. As the tray stack 500 is pivoted about the pivot axis 546, the semi-cylindrical surface 572 of the protrusion 570 of the base 214 engages the detent 560 of the hinge member 524. This engagement of the protrusion 570 and the detent 560 retains the tray stack 500 in the open position until a rotational force sufficient to overcome the engagement of the protrusion 570 and the detent 560 is applied to the tray stack 500. When a sufficient rotational force is applied to the tray stack 500, the tray stack 500 pivots about the pivot axis 546 until the semi-cylindrical surface 572 of the protrusion 570 of the base 214 is disposed in the first retention portion 562 of the hinge member 524.

Referring now to FIGS. 7 and 29-31, the enclosure 202 includes a cable cover 600. The cable cover 600 is disposed in the interior region 266 of the enclosure 202. In one aspect of the present disclosure, the cable cover 600 is mounted in the cover 216 of the enclosure 202. The cable cover 600 and the cover 216 cooperatively define a space between the cable cover 600 and the cover 216 in which portions of optical fibers that include connectorized ends connected to the inner ports 232 of the fiber optic adapters 226 are disposed. With portions of the optical fibers disposed in the space between the cable cover 600 and the cover 216, the cable cover 600 reduces the risk of the optical fibers connected to the fiber optic adapters 226 from becoming tangled in the interior region 266 of the enclosure 202.

The cable cover 600 includes a first end portion 602, an oppositely disposed second end portion 604 and a base portion 606 disposed between the first and second end portions 602, 604. In one aspect of the present disclosure, the cable cover 600 is non-planar. In another aspect of the present disclosure, the first and second end portions 602, 604 are vertically displaced from the base portion 606. In another aspect of the present disclosure, the cable cover 600 is generally U-shaped.

The base portion 606 of the cable cover 600 is adapted to be positioned immediately adjacent to an inside surface 608 of the cover 216 of the enclosure 202 that extends between the first and second ends 210, 212. With the base portion 606 of the cable cover 600 dispose adjacent to the inside surface 608 of the cover 216, the first and second end portions 602, 604 are adapted to be disposed adjacent to the first and second ends 210, 212 of the interior region 266 of the enclosure 202. The first and second end portions 602, 604 are adapted to route optical fibers from the fiber optic adapters 226 mounted to the first and second ends 210, 212, respectively, of the enclosure 202 under the base portion 606 of the cable cover 600.

The base portion 606 defines a first recess 610 and an oppositely disposed second recess 612. The first and second recesses 610, 612 provide a passageway through which optical fibers can exit the space provided between the base portion 606 and the inside surface 608 of the cover 216.

In one aspect of the present disclosure, the cable cover 600 is a thin plastic material. In another aspect of the present disclosure, the cable cover 600 is a transparent material.

In one aspect of the present disclosure, the cable cover 600 is mechanically retained in the cover 216. In another aspect, the first and second end portions 602, 604 of the cable cover 600 are engaged to the fiber optic adapters 226 mounted to the first and second ends 210, 212 of the enclosure 202.

In one aspect of the present disclosure, the first end portion 602 includes a first plurality of fingers 614 that extend outwardly from the first end portion 602 of the cable cover 600 while the second end portion 604 includes a second plurality of fingers 616 that extend outwardly from the second end portion 604 of the cable cover 600. Each of the first and second plurality of fingers 614, 616 are adapted to be received in corresponding retention openings 618 (shown in FIG. 5) of the fiber optic adapters 226. The retention openings 618 of the fiber optic adapter 226 are disposed adjacent to the inner port 232 of the first piece 230 of the main housing 228.

An exemplary method to insert the cable cover 600 into the enclosure 202 will now be described. With optical fibers disposed in the interior region 266 of the enclosure 202 and connected to the inner ports 232 of the fiber optic adapters 226, the cable cover 600 can be inserted into the enclosure 202. The first and second end portions 602, 604 of the cable cover 600 are flexed toward each other. With the first and second end portions 602, 604 flexed toward each other, the base portion 606 is positioned immediately adjacent to the inside surface 608 of the cover 216 such that the base portion 606 covers a portion of the optical fibers extending from the inner portion 232 of the fiber optic adapters 226. The first and second end portions 602, 604 are released such that the first and second plurality of fingers 614, 616 are inserted into the corresponding retention openings 618 of the fiber optic adapters 226.

Referring now to FIGS. 32-35, an alternate embodiment of an enclosure assembly 700 is shown. The enclosure assembly 700 includes an enclosure 702. The enclosure 702 includes a first side 706 and an oppositely disposed second side 708. The enclosure 702 further includes a first end 710 and an oppositely disposed second end 712. The first and second ends 710, 712 extend between the first and second sides 706, 708.

The enclosure 702 includes a base 714 and a cover 716. The cover 716 is pivotally mounted to the base 714 by hinges 718 disposed on the first side 706 of the enclosure 702. A plurality of latches 720, which is adapted to secure the cover 716 in a closed position relative to the base 714, is disposed on the second side 708 of the enclosure 702.

Each of the first and second ends 710, 712 of the enclosure 702 includes a mounting portion 722. The mounting portions 722 define a plurality of mounting openings 724. Each of the mounting openings 724 is adapted to receive a cable port 726. In the depicted embodiment, the cable port 726 is a pass-thru fitting 726. Exemplary pass-thru fittings 726 have been described in U.S. Patent Application Ser. No. 61/155,099, entitled "Fiber Optic Cable Pass-Thru Fitting" and filed on Feb. 24, 2009, U.S. Patent Application Ser. No. 61/157,119, entitled "Fiber Optic Cable Pass-Thru Fitting" and filed on Mar. 3, 2009, U.S. Patent Application Ser. No. 61/158,212, entitled "Fiber Optic Cable Pass-Thru Fitting" and filed on Mar. 6, 2009, and U.S. Patent Application Ser. No. 61/167,106, entitled "Drop Cable Pass-Thru Fitting" and filed on Apr. 6, 2009, the disclosures of which are hereby incorporated by reference in their entirety.

Each of the pass-thru fittings 726 on the first end 710 of the enclosure 702 is adapted to receive a fiber optic drop cable 728. The fiber optic drop cable 728 is adapted for optical connection to a subscriber location. The fiber optic drop cable 728 includes a first optical fiber 730.

The base 714 and the cover 716 of the enclosure 702 cooperatively define an interior region 732. The enclosure 702 further defines a plurality of cable openings 734 that are adapted for allowing a fiber optic distribution cable to be routed into the interior region 732 of the enclosure 702. In one aspect of the present disclosure, the fiber optic distribution cable is a high fiber count cable. In one aspect of the present disclosure, the fiber optic distribution cable includes at least twelve optical fibers. The cable openings 734 allow the enclosure 702 to be mounted at a mid-span location along the fiber optic distribution cable.

The enclosure assembly 700 includes a tray stack 736 disposed in the interior region 732 of the enclosure 702. The tray stack 736 includes a plurality of trays 738 that is mounted to a tray mounting plate. The tray stack 736 provides a location in the enclosure 702 at which optical fibers of the fiber optic cable that are routed through the enclosure 702 can be terminated and/or split. In one aspect of the present disclosure, the plurality of trays 738 includes at least one splice tray 740 and at least one splitter tray 742.

In order to facilitate access to the fiber optic cable and/or the optical fibers routed through the enclosure 702, the tray stack 736 selectively pivots relative to the enclosure 702. In one aspect of the present disclosure, the tray stack 736 selectively pivots between a closed position (shown in FIG. 32)

and an open position. In one aspect of the present disclosure, the open position of the tray stack 736 is about 90 degrees from the closed position.

Referring now to FIGS. 36-39, the enclosure assembly 700 further includes an adapter plate assembly 750. The adapter plate assembly 750 is disposed in the interior region 732 of the enclosure 702 such that the adapter plate assembly 750 is enclosed by the enclosure 702 when the cover 716 is in a closed position relative to the base 714. In one aspect of the present disclosure, the adapter plate assembly 750 is disposed midway between the first and second ends 710, 712. The adapter plate assembly 750 includes an adapter plate 752 and a plurality of adapters 754 mounted to the adapter plate 752. In one aspect of the present disclosure, the adapters 754 of the adapter plate assembly 750 are non-ruggedized adapters.

Figure 38:
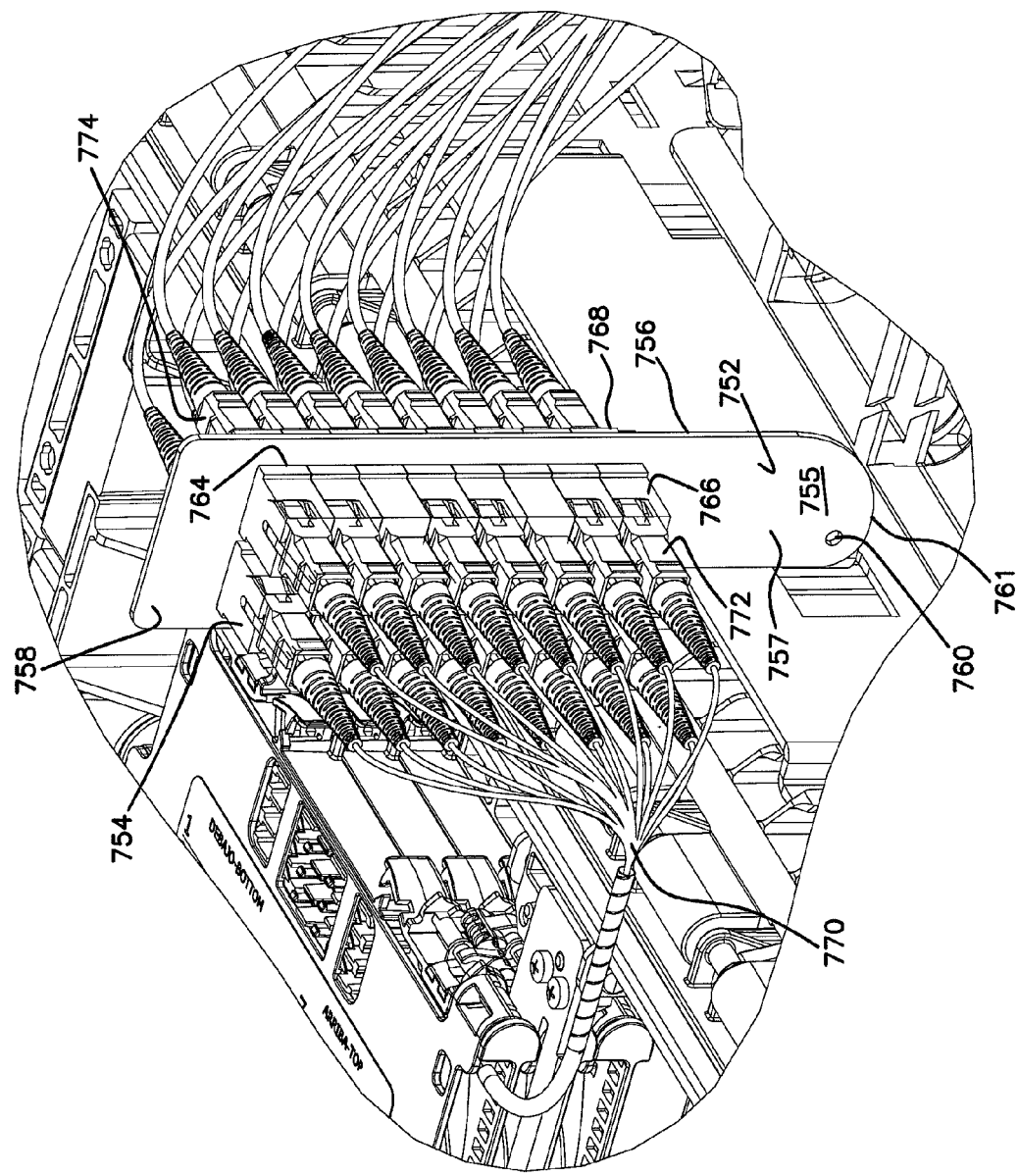
FIG. 38 is a fragmentary perspective view of the adapter plate assembly of FIG. 37.

In one aspect of the present disclosure, the adapter plate 752 is adapted for movement between a first position (shown in FIG. 36) and a second position (shown in FIG. 38). The adapter plate 752 is pivotally mounted to the first side 706 of the enclosure 702. In one aspect of the present disclosure, the adapter plate 752 is pivotally mounted to the first side 706 of the cover 716.

The adapter plate 752 includes a first side 755 and an oppositely disposed second side 756. The adapter plate 752 further includes a first end portion 757 and an oppositely disposed second end portion 758. The first end portion 757 of the adapter plate 752 includes a mount 760 and an edge 761. The mount 760 is adapted for engagement with a corresponding mount on the first side 706 of the enclosure 702. In one aspect of the present disclosure, the mount 760 is a thru-hole that is adapted to receive a pin structure 762. In one aspect of the present disclosure, the mount 760 is in snap-fit engagement with the pin structure 762.

In one aspect of the present disclosure, the edge 761 is generally arcuate or curved in shape. The arcuate shape of the edge 761 provides clearance between the adapter plate 752 and the first side 706 of the enclosure 702 as the adapter plate assembly 700 is moved between the first and second positions.

The adapter plate 752 defines an adapter slot 764 that extends through the first and second sides 755, 756. In one aspect of the present disclosure, the adapter plate 752 includes a plurality of adapter slots 764. The adapter slot 764 is sized to receive the plurality of adapters 754. In one aspect of the present disclosure, the adapters 754 are in snap-fit engagement with the adapter slot 764. In one aspect of the present disclosure, the adapter plate 752 includes a plurality of adapter slots 764.

The adapters include a first axial end 766, which is accessible from the first side 755 of the adapter plate 752, and an oppositely disposed second axial end 768, which is accessible from the second side 756 of the adapter plate 752. Each of the first and second axial ends 766, 768 are adapted to receive a connectorized end of an optical fiber.

Referring now to FIGS. 32-39, a routing scheme for the enclosure assembly 700 will be described. The fiber optic distribution cable is inserted through the cable opening 734. The second optical fibers of the fiber optic distribution cable are routed to at least one of the splice tray 740 or the splitter tray 742. In the scenario where the optical fibers are routed to the splice tray 740, the optical fibers are spliced to pigtails 770. The pigtails 770 include connectorized ends 772. In the scenario where the optical fiber of the fiber optic distribution cable is routed to the splitter tray 742, the optical fiber is split into many optical fibers having connectorized ends 772. The connectorized ends 772 are engaged to the second axial ends 768 of the adapters 754.

The first optical fibers 730 of the fiber optic drop cables 728 include connectorized ends 774. The connectorized ends 774 are engaged to the first axial end 766 of the adapters 754.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic enclosure for mounting at a mid-span access location of a fiber optic cable comprising:
   an enclosure having:
   a base;
   a cover connected to the base, wherein the base and the cover cooperate to define an interior region;
   wherein the enclosure includes a tray mount disposed in the interior region;
   a plurality of fiber optic cable ports mounted to the enclosure;
   a tray stack mounted within the interior region of the enclosure, the tray stack including:
   a tray mounting plate assembly pivotally connected to the tray mount of the enclosure, the tray mounting plate assembly including a tray mounting plate and a detent that engages the tray mount to selectively retain the tray stack in an open position and a closed position; and
   a plurality of trays mounted to the tray mounting plate.

2. The fiber optic enclosure of claim 1, wherein the tray mounting plate assembly includes a hinge member that is engaged with the tray mounting plate, the hinge member being adapted to selectively pivot about a pivot axis.

3. The fiber optic enclosure of claim 2, wherein the hinge member includes the detent.

4. The fiber optic enclosure of claim 3, wherein the detent extends outwardly from a surface of the hinge member.

5. The fiber optic enclosure of claim 4, wherein the detent extends outwardly from the surface at an angle α, the angle α being in the range of about 120 degrees to about 150 degrees.

6. The fiber optic enclosure of claim 1, wherein the tray mounting assembly includes a first retention portion and a second retention portion disposed adjacent to the detent.

7. The fiber optic enclosure of claim 6, wherein the detent is disposed between the first and second retention portions.

8. The fiber optic enclosure of claim 7, wherein the first and second retention portions are recesses in the hinge member that are adapted to receive a protrusion disposed on the tray mount of the enclosure to retain the tray stack in the open and closed position.

9. The fiber optic enclosure of claim 1, further comprising a cable cover mounted in the cover of the enclosure, the cable cover and the cover cooperatively defining a space between the cable cover and the cover in which portions of optical fibers are disposed.

10. The fiber optic enclosure of claim 9, wherein the cable cover is transparent.

11. The fiber optic enclosure of claim 1, wherein the fiber optic cable ports are fiber optic adapters.

12. The fiber optic enclosure of claim 1, wherein the fiber optic cable ports are pass-thru fittings.

13. The fiber optic enclosure of claim 1, further comprising an adapter plate assembly disposed in the interior region of the enclosure, the adapter plate assembly including an adapter plate and a plurality of adapters mounted to the adapter plate, the adapter plate being adapted for movement between a first position and a second position.

14. The fiber optic enclosure of claim 1, wherein the tray stack includes at least one splice tray and at least one splitter tray.

15. A fiber optic enclosure for mounting at a mid-span access location of a fiber optic cable comprising:
- an enclosure having:
  - a base;
  - a cover connected to the base, wherein the base and the cover cooperate to define an interior region;
  - wherein the enclosure includes a tray mount disposed in the interior region;
- a plurality of fiber optic adapters mounted to the enclosure, wherein the fiber optic adapters include an inner port positioned inside the interior region and an outer port positioned at an outer surface of the enclosure;
- a cable cover mounted in the cover of the enclosure, the cable cover including a first end portion and an oppositely disposed second end portion, the first and second end portions being engaged to the fiber optic adapters, the cable cover and the cover cooperatively defining a space between the cable cover and the cover in which portions of optical fibers are disposed;
- a tray stack mounted within the interior region of the enclosure, the tray stack including:
  - a tray mounting plate assembly pivotally connected to the tray mount of the enclosure, the tray mounting plate assembly including a tray mounting plate and a detent that engages the tray mount to selectively retain the tray stack in an open position and a closed position; and
  - a plurality of trays mounted to the tray mounting plate.

16. The fiber optic enclosure of claim 15, wherein the cable cover is transparent.

17. The fiber optic enclosure of claim 15, wherein the detent extends outwardly from a surface of a hinge member of the tray mounting plate assembly.

18. A fiber optic enclosure for mounting at a mid-span access location of a fiber optic cable comprising:
- an enclosure having:
  - a base;
  - a cover connected to the base, wherein the base and the cover cooperate to define an interior region;
  - wherein the enclosure includes a tray mount disposed in the interior region;
- a plurality of pass-thru fittings mounted to the enclosure;
- a tray stack mounted within the interior region of the enclosure, the tray stack including:
  - a tray mounting plate assembly pivotally connected to the tray mount of the enclosure, the tray mounting plate assembly including a tray mounting plate and a detent that engages the tray mount to selectively retain the tray stack in an open position and a closed position;
  - a plurality of trays mounted to the tray mounting plate; and
- an adapter plate assembly disposed in the interior region of the enclosure, the adapter plate assembly including an adapter plate and a plurality of adapters mounted to the adapter plate, the adapter plate being adapted for movement between a first position and a second position.

19. The fiber optic enclosure of claim 18, wherein the adapter plate includes a first end portion and an oppositely disposed second end portion, the first end portion including a mount that is adapted for engagement with a corresponding mount on the enclosure.

20. The fiber optic enclosure of claim 19, wherein the corresponding mount of the enclosure is a pin structure, the mount of the adapter plate being in snap-fit engagement with the pin structure.

* * * * *